(12) United States Patent
Ball et al.

(10) Patent No.: US 11,574,359 B1
(45) Date of Patent: Feb. 7, 2023

(54) INTERACTIVE BANKING USING MULTIPLE CHECKING ACCOUNTS

(71) Applicant: Wells Fargo Bank, N.A., San Francisco, CA (US)

(72) Inventors: Deborah M. Ball, San Francisco, CA (US); Susanne Carr, Oakland, CA (US); Stephen M. Ellis, Tahoe City, CA (US); Lei Han, San Francisco, CA (US); Margaret Mangot, San Francisco, CA (US); Stanislav Roumiantsev, San Francisco, CA (US); Abhijit Shetti, Pleasanton, CA (US); Brad J. Shoff, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 92 days.

(21) Appl. No.: 16/044,370

(22) Filed: Jul. 24, 2018

Related U.S. Application Data

(60) Provisional application No. 62/536,805, filed on Jul. 25, 2017.

(51) Int. Cl.
*G06Q 20/00* (2012.01)
*G06Q 40/02* (2012.01)
(Continued)

(52) U.S. Cl.
CPC .......... *G06Q 40/02* (2013.01); *G06Q 20/102* (2013.01); *G06Q 20/108* (2013.01); *G06Q 20/227* (2013.01)

(58) Field of Classification Search
CPC ...... G06Q 20/10; G06Q 20/22; G06Q 20/102; G06Q 20/108; G06Q 40/02
(Continued)

(56) References Cited

U.S. PATENT DOCUMENTS

| 7,478,062 B2 | 1/2009 | Ansley |
| 7,813,983 B2 | 10/2010 | Wottowa et al. |

(Continued)

OTHER PUBLICATIONS

Envudu Help Center, "How does it work?", http://help.envudu.com/about-the-envudu-mobile-app/how-does-it-work, downloaded Jul. 13, 2017. 2 pages.

(Continued)

*Primary Examiner* — Rajesh Khattar
*Assistant Examiner* — Mohammed H Mustafa
(74) *Attorney, Agent, or Firm* — Foley & Lardner LLP

(57) ABSTRACT

A financial institution computing system associated with a financial institution includes an account management circuit. The account management circuit is configured to receive, by the network interface, a customer request to establish a checking account at the financial institution, create first and second checking accounts for the customer, the first checking account having a payment card associated therewith, the second checking account not having any payment cards associated therewith, receive, by the network interface, information regarding a funding amount for the first and second payment accounts, receive, by the network interface, information regarding a first expense of the customer, and fund the second account with a first portion of the funding amount based on the information regarding the first expense.

25 Claims, 23 Drawing Sheets

(51) Int. Cl.
*G06Q 20/10* (2012.01)
*G06Q 20/22* (2012.01)

(58) Field of Classification Search
USPC .................................................. 705/4, 35–45
See application file for complete search history.

(56) References Cited

U.S. PATENT DOCUMENTS

| | | | |
|---|---|---|---|
| 8,306,914 | B2 | 11/2012 | Johns et al. |
| 8,630,947 | B1 | 1/2014 | Freund |
| 8,738,527 | B2 | 5/2014 | Kalinichenko et al. |
| 9,443,268 | B1 | 9/2016 | Kapczynski et al. |
| 9,582,830 | B2 | 2/2017 | Johns et al. |
| 9,928,549 | B2 | 3/2018 | Stern et al. |
| 10,055,727 | B2 | 8/2018 | Aiglstorfer |
| 10,078,867 | B1 | 9/2018 | Chan et al. |
| 10,733,610 | B2 | 8/2020 | Martin |
| 2002/0123949 | A1 | 9/2002 | Vanleeuwen |
| 2003/0061162 | A1* | 3/2003 | Matthews .............. G06Q 20/10 705/41 |
| 2007/0282743 | A1 | 12/2007 | Lovelett et al. |
| 2008/0189185 | A1 | 8/2008 | Matsuo et al. |
| 2008/0270304 | A1* | 10/2008 | Brown .................. G06Q 40/08 705/44 |
| 2012/0030043 | A1 | 2/2012 | Ross et al. |
| 2012/0179558 | A1 | 7/2012 | Fischer |
| 2012/0233015 | A1 | 9/2012 | Calman et al. |
| 2013/0041819 | A1 | 2/2013 | Khasho |
| 2013/0054436 | A1 | 2/2013 | Hanson et al. |
| 2014/0089153 | A1 | 3/2014 | Pinski |
| 2014/0122340 | A1 | 5/2014 | Flitcroft et al. |
| 2014/0136381 | A1 | 5/2014 | Joseph et al. |
| 2014/0156536 | A1 | 6/2014 | Grigg et al. |
| 2014/0188704 | A1 | 7/2014 | Grossman et al. |
| 2015/0100475 | A1 | 4/2015 | Cummings et al. |
| 2015/0254648 | A1 | 9/2015 | Clements et al. |
| 2015/0269671 | A1 | 9/2015 | Garrity et al. |
| 2015/0294297 | A1 | 10/2015 | Lipshultz |
| 2015/0302398 | A1 | 10/2015 | Desai et al. |
| 2015/0379488 | A1* | 12/2015 | Ruff ....................... G06Q 40/02 705/36 R |
| 2016/0132875 | A1 | 5/2016 | Blanco et al. |
| 2016/0140654 | A1 | 5/2016 | Bhat et al. |
| 2016/0247233 | A1 | 8/2016 | Page |
| 2017/0004577 | A1 | 1/2017 | Cunningham |
| 2017/0024813 | A1 | 1/2017 | Crouspeyre et al. |
| 2017/0032353 | A1 | 2/2017 | Vadivel et al. |
| 2017/0061535 | A1 | 3/2017 | Williams |
| 2017/0109540 | A1* | 4/2017 | Heiman ................. G06Q 20/10 |
| 2017/0109817 | A1 | 4/2017 | Vea et al. |
| 2017/0301014 | A1 | 10/2017 | Singer |
| 2018/0025331 | A1 | 1/2018 | Dallenbach et al. |
| 2018/0225756 | A1 | 8/2018 | Wasser et al. |

OTHER PUBLICATIONS

Envudu, "Experience the power of weekly based spending", http://help.envudu.com/envudu-s-key-features-explained/experience-the-power-of-weekly-based-spending, downloaded Jul. 13, 2017. 2 pages.
Envudu, "Leverage emotion to eliminate overspending", https://envudu.com/#/, downloaded Jul. 13, 2017. 11 pages.
Envudu, Reservoir smooths out income highs and lows, http://help.envudu.com/envudu-s-key-features-explained/reservoir-smooths-out-income-highs-and-lows, downloaded Jul. 13, 2017. 2 pages.
Grant, Kinsey, "Wells Fargo Debuts "Greenhouse" Digital Bank Accounts Without Overdrafts", The Street, Nov. 2, 2017. 4 pages.

\* cited by examiner

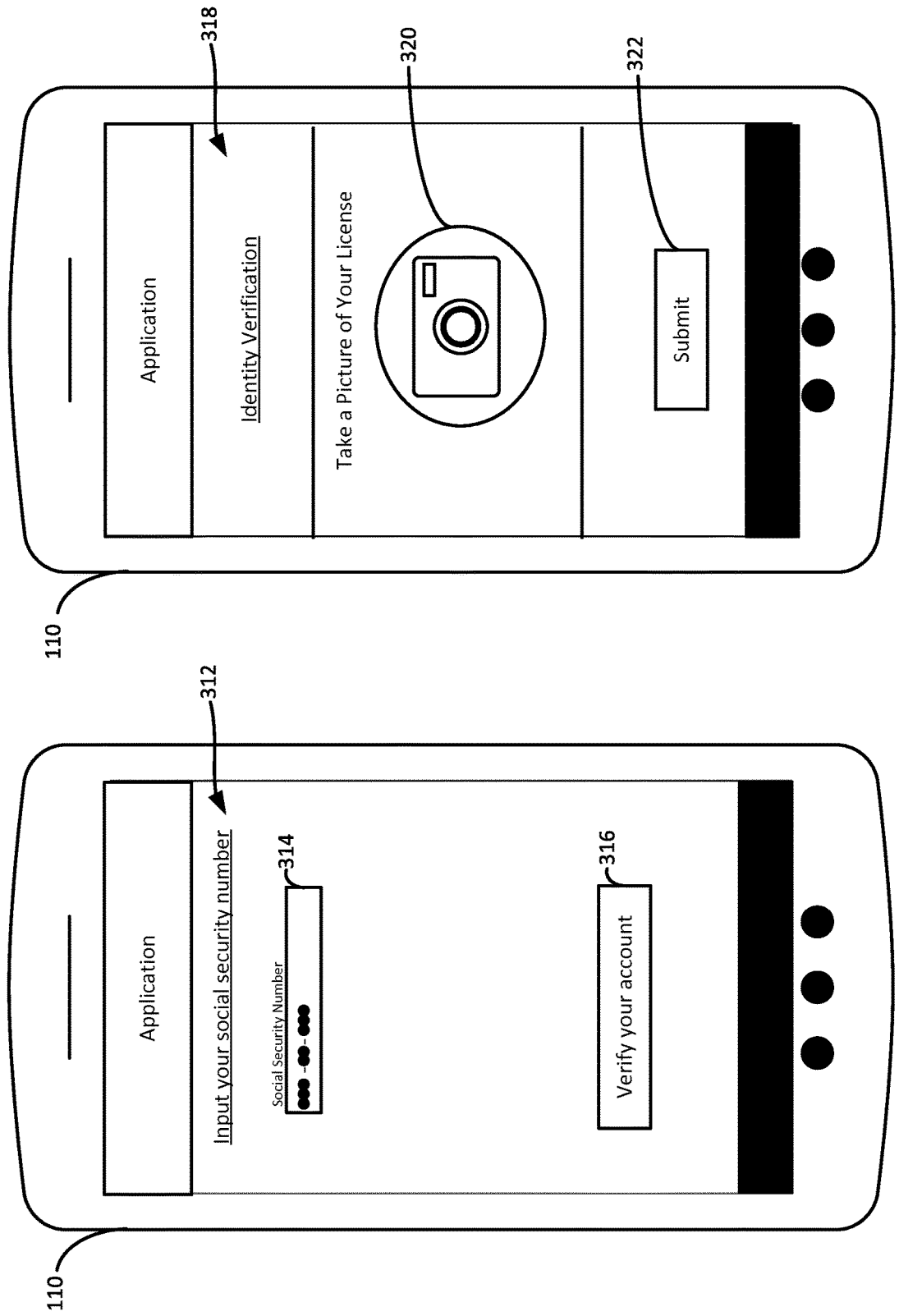

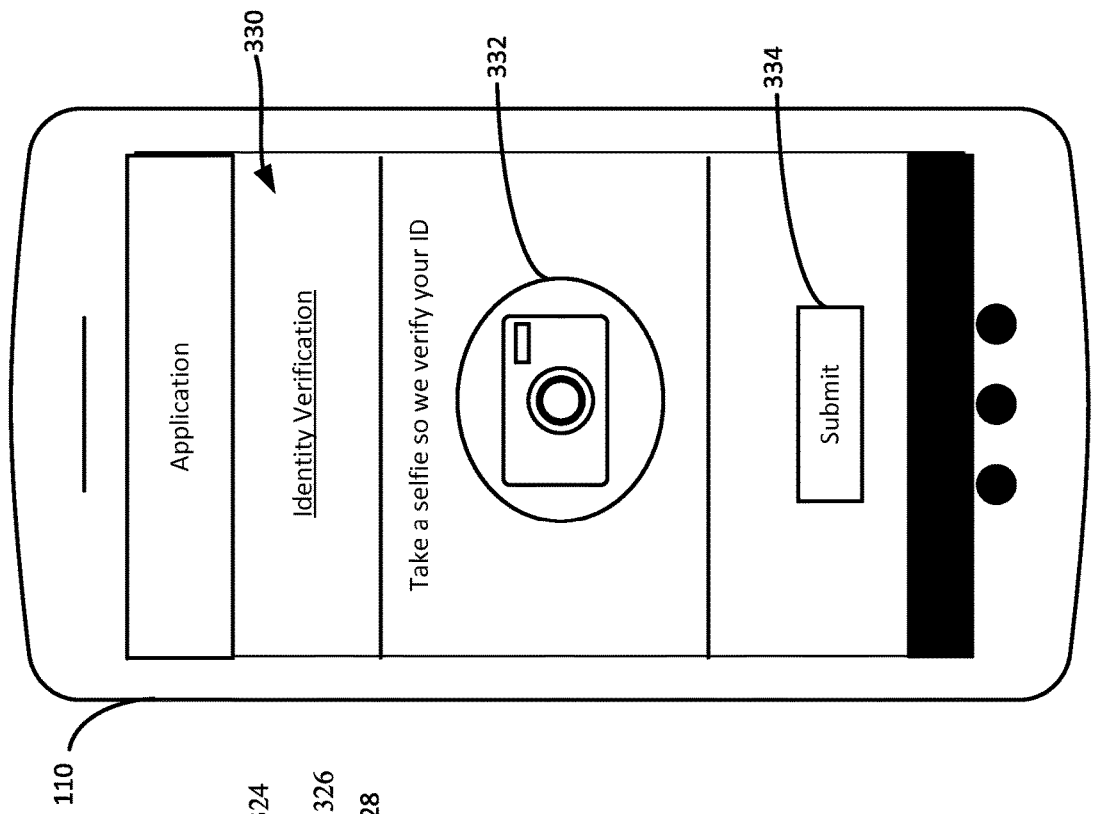
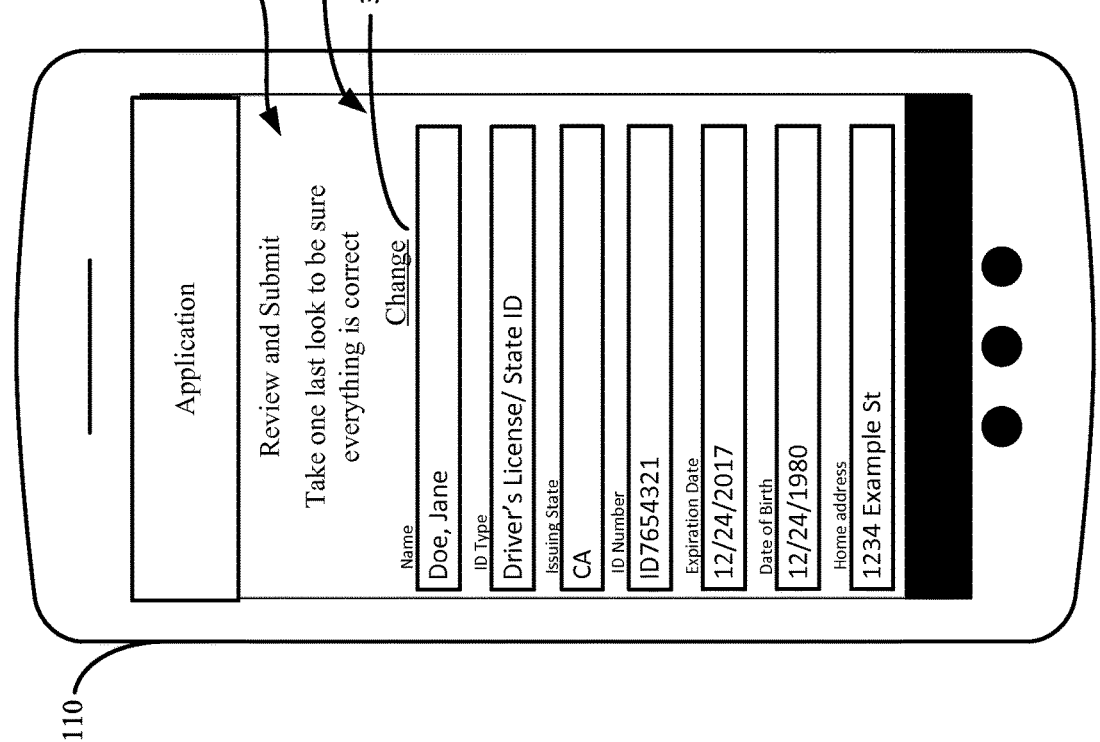
FIG. 3F
FIG. 3E

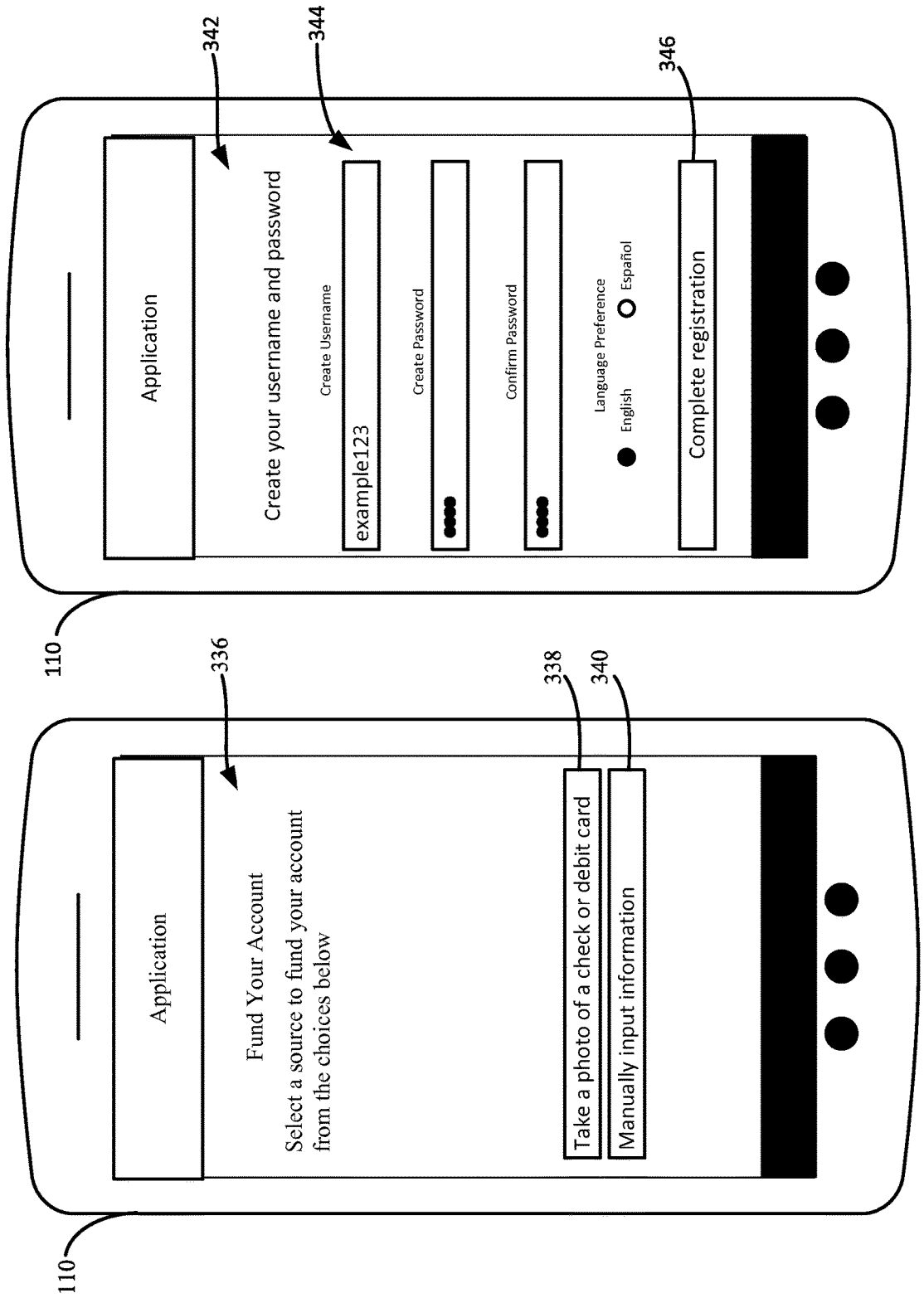

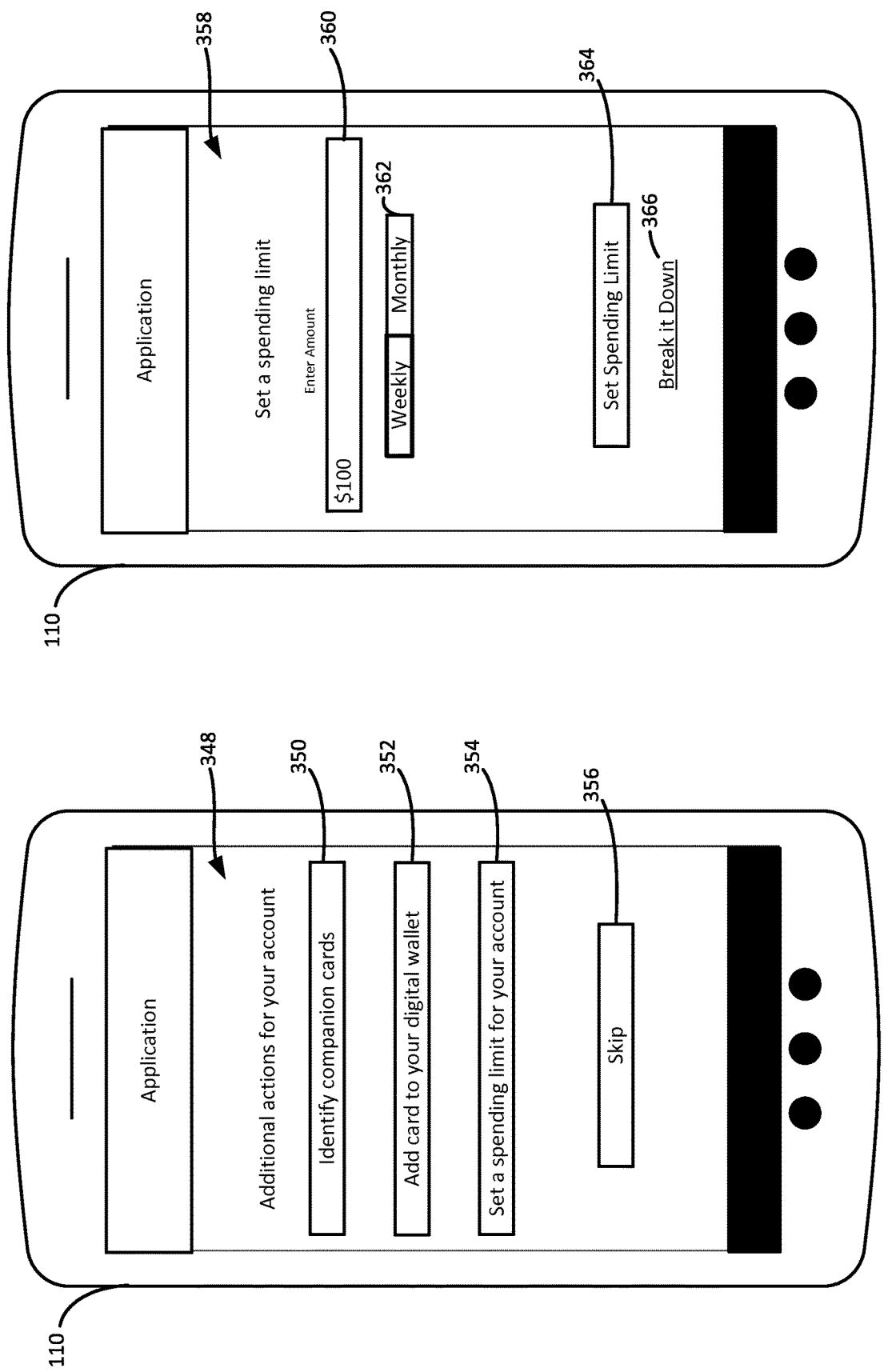

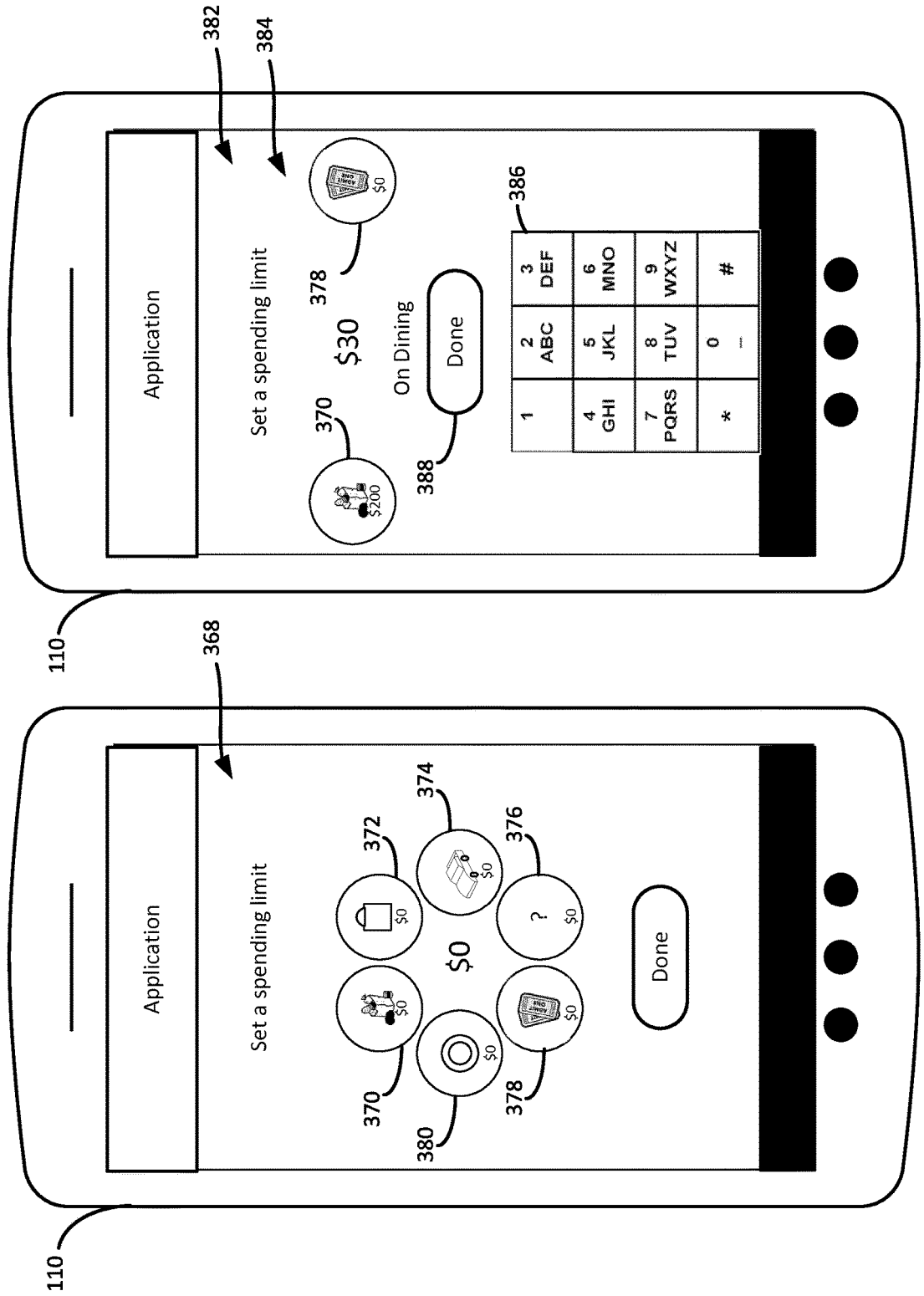

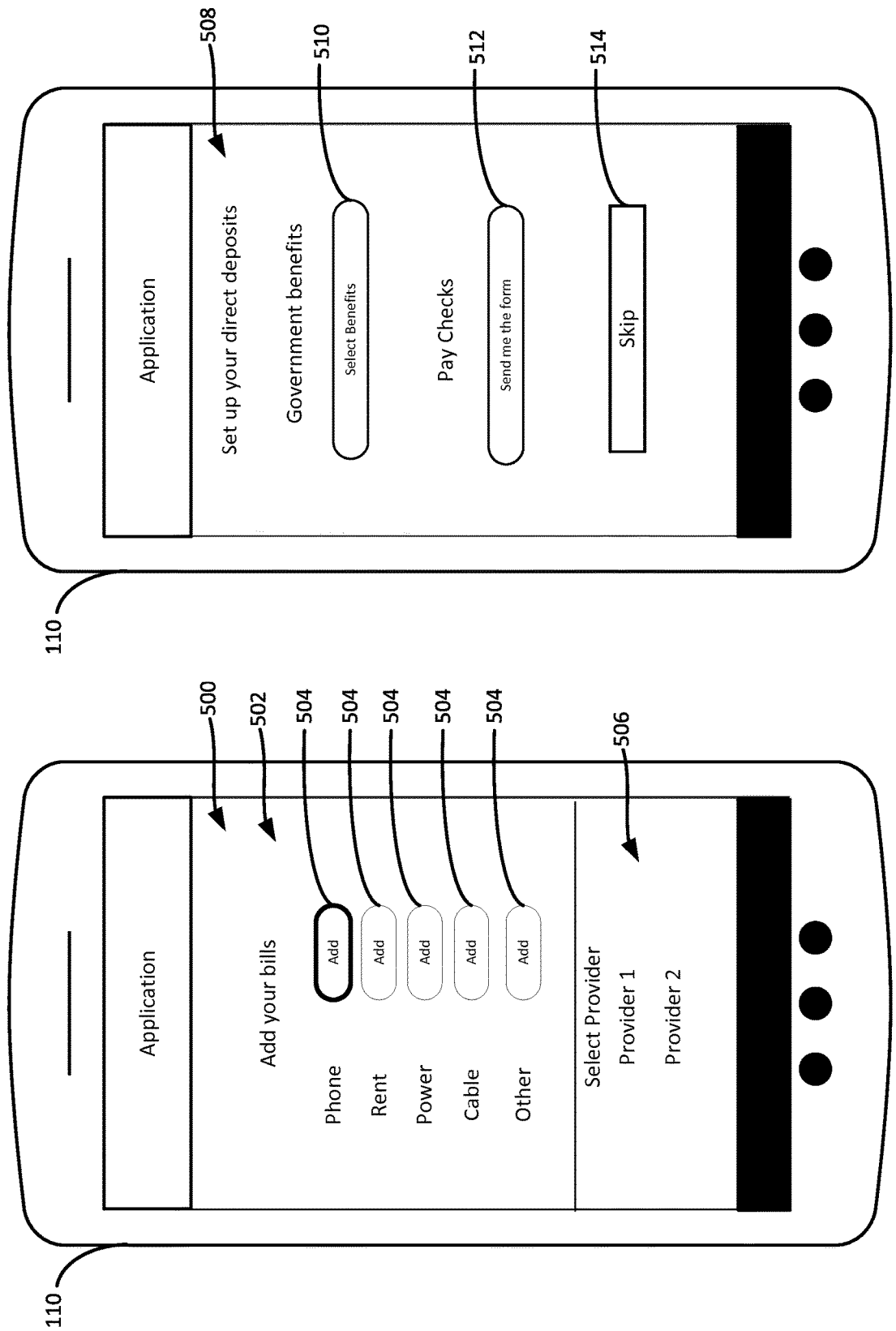

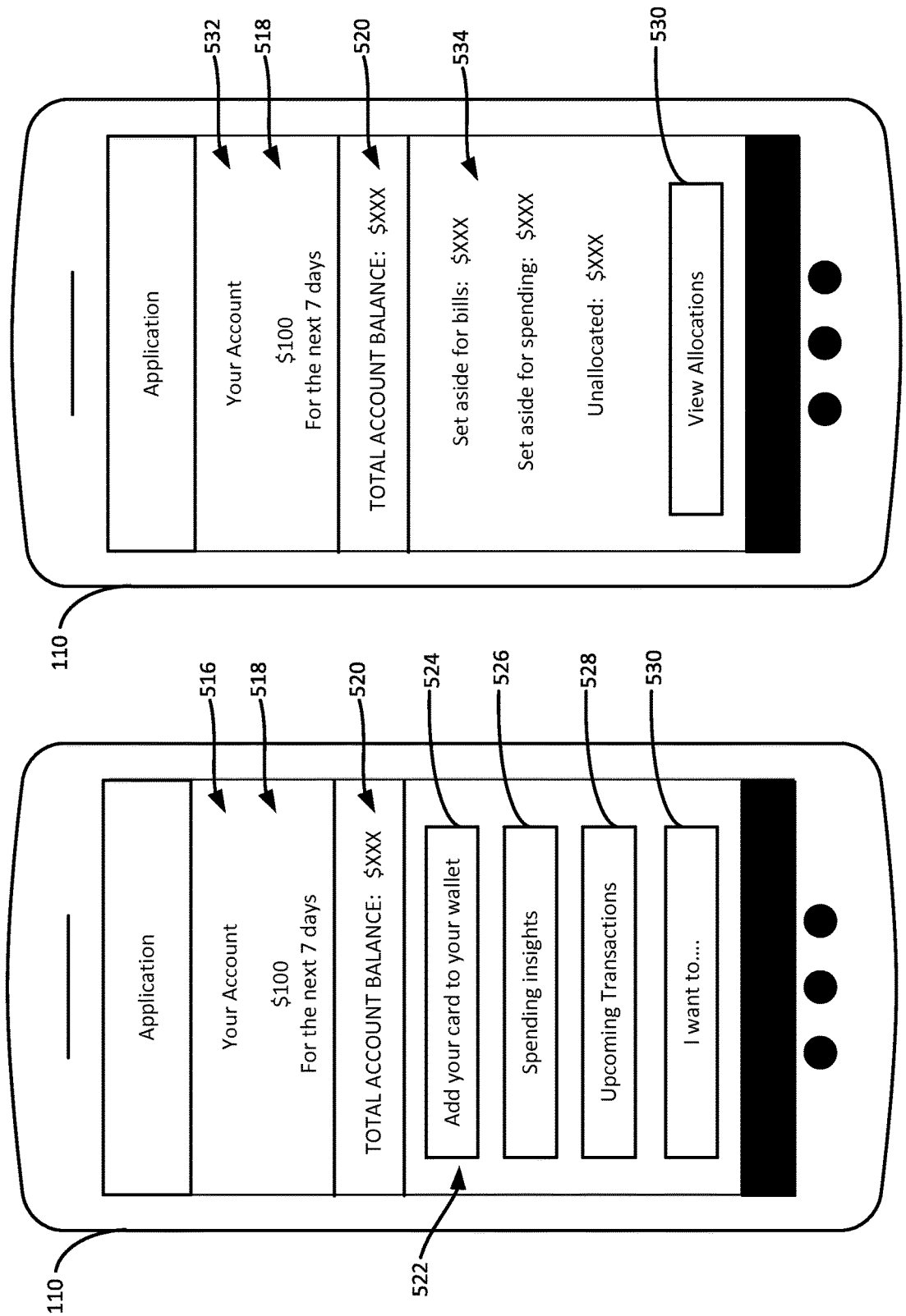

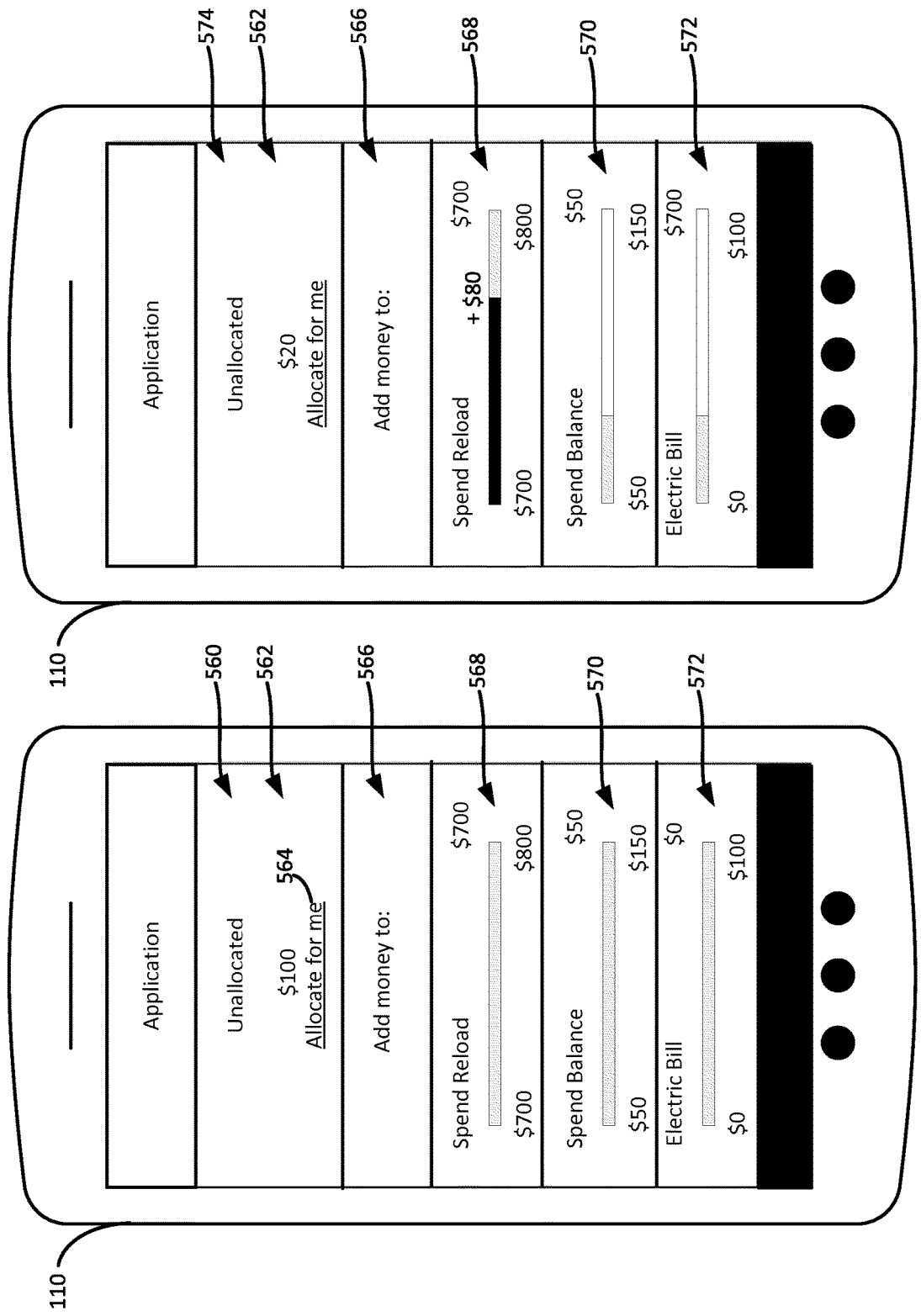

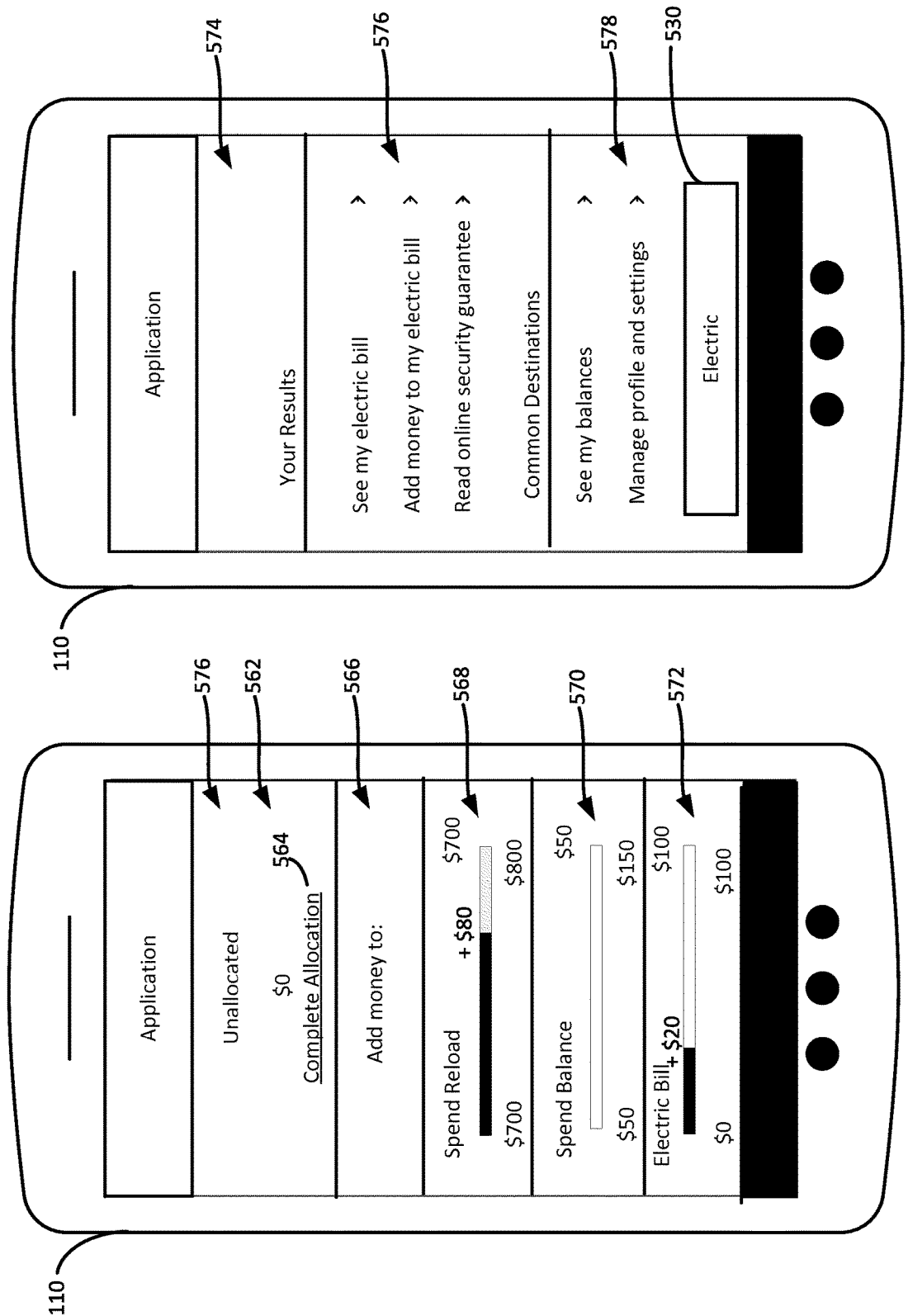

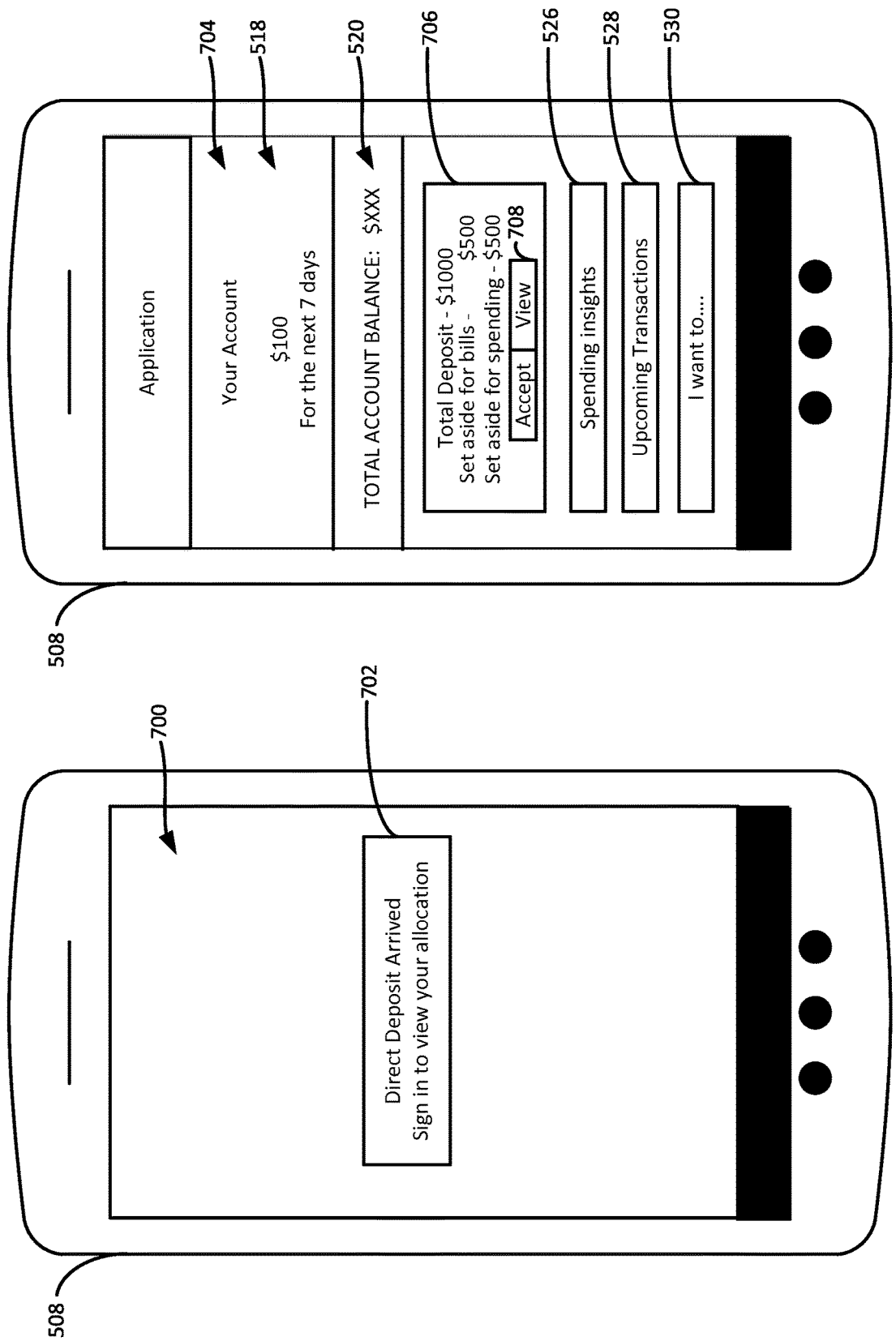

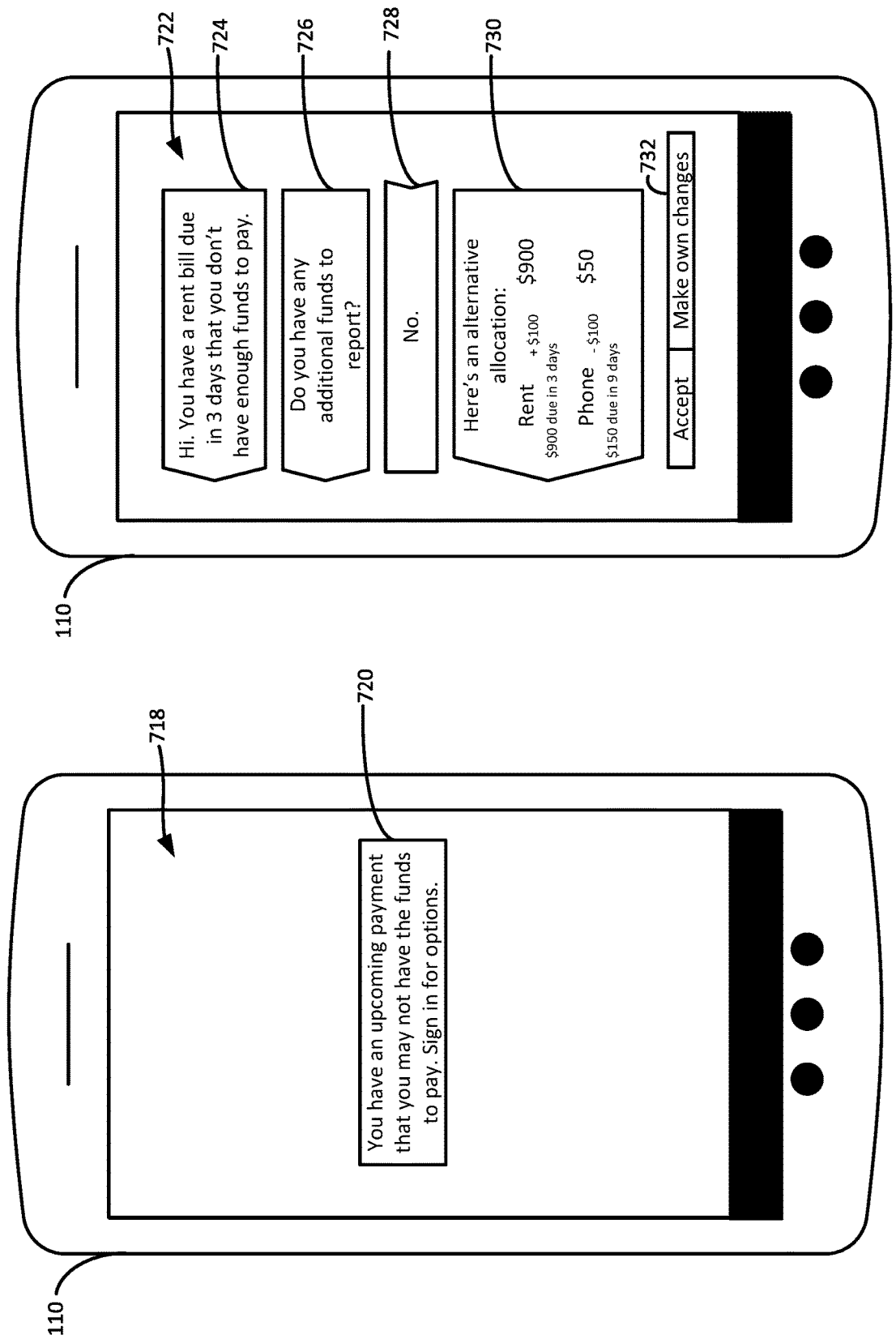

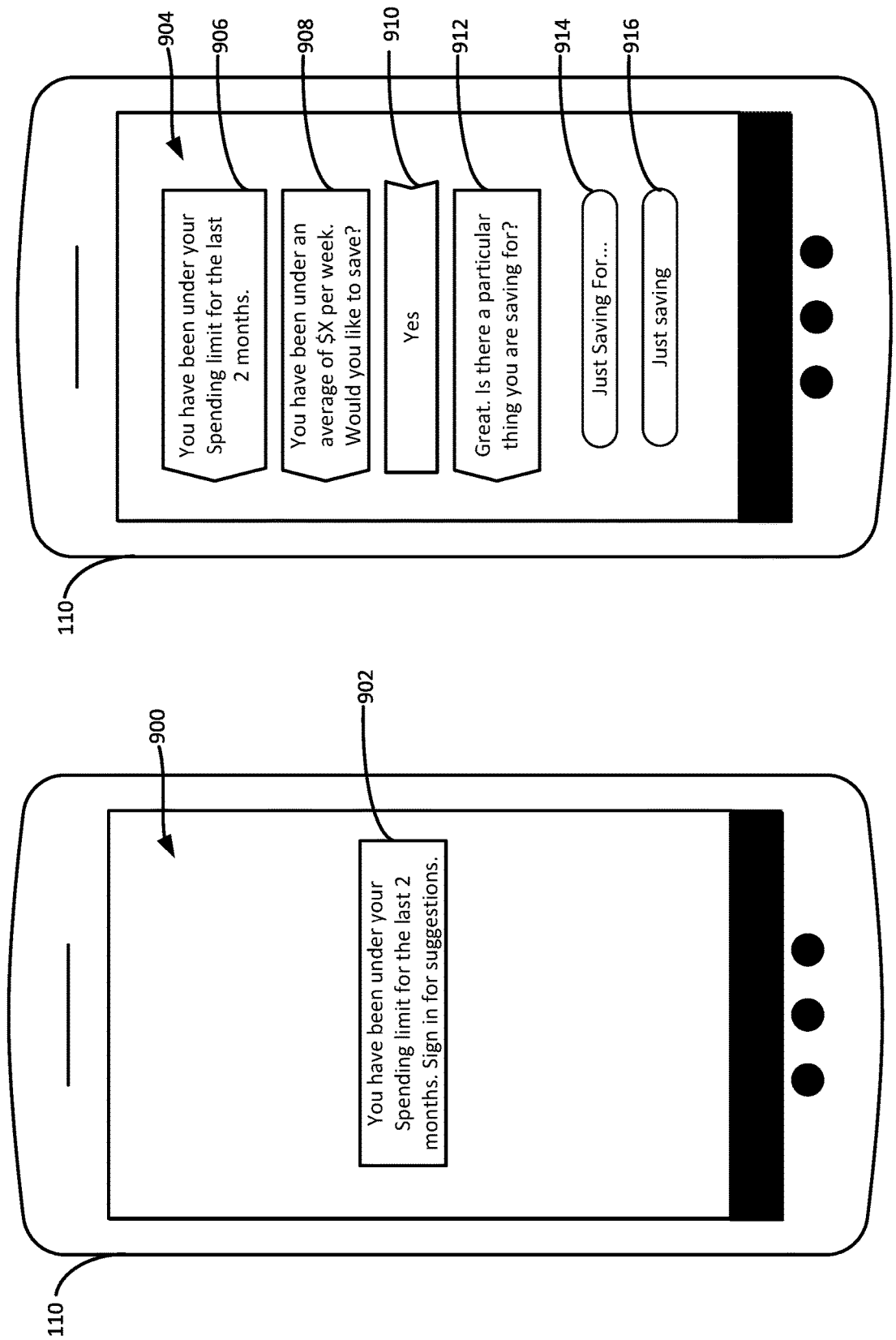

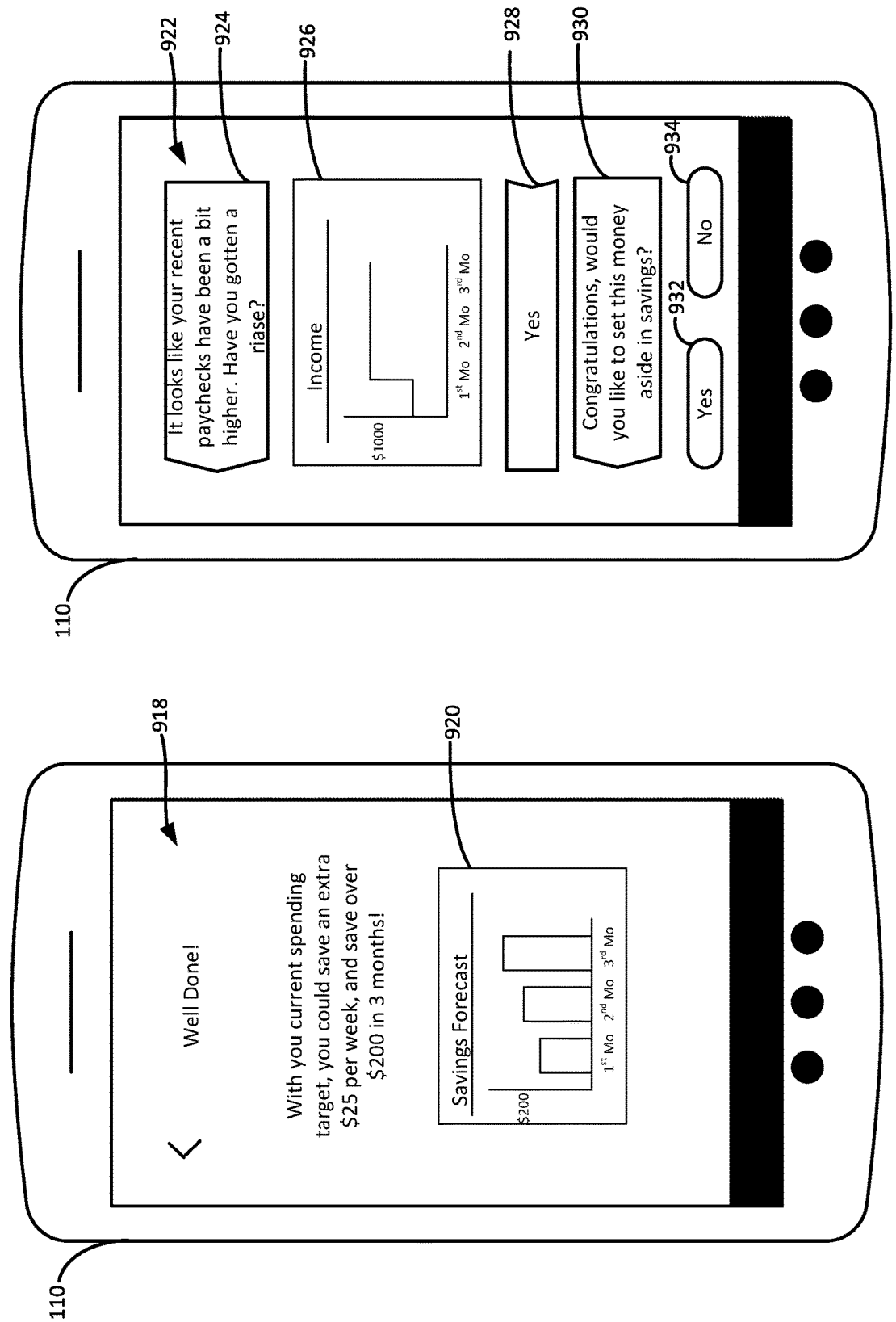

US 11,574,359 B1

INTERACTIVE BANKING USING MULTIPLE CHECKING ACCOUNTS

CROSS REFERENCE TO RELATED APPLICATION

This application claims priority to U.S. Provisional Patent Application No. 62/536,805 entitled "Interactive Banking Using Multiple Checking Accounts," filed Jul. 25, 2017, and hereby incorporated by reference in its entirety.

BACKGROUND

Many customers look for more from their financial institutions than the maintenance of checking and savings accounts. For example, customers may seek guidance relating to budgeting their funds between various expenses. Unfortunately, it is oftentimes difficult for customers to receive such services. This is especially the case for new customers, who must first register for a new account, await approval, and then identify how to receive any additional services desired from the financial institution either themselves or through contacting the financial institution directly. Thus, it would be beneficial to provide an integrated customer onboarding experience enabling a customer to both register for an account as well as additional services in a convenient manner.

SUMMARY

One embodiment relates to a financial institution computing system associated with a financial institution. The financial institution computing system includes a network interface configured to communicate data over a network. The financial institution computing system also includes an accounts database configured to store information regarding a plurality of accounts associated with a plurality of customers of the financial institution. The financial institution computing system also includes an account management circuit configured to receive, by the network interface, a customer request to establish an account at the financial institution. In response to receiving the customer request, the account management circuit is also configured to create first and second checking accounts for the customer, the first checking account having a payment card associated therewith, the second checking account not having any payment cards associated therewith. The account management circuit is also configured to receive, by the network interface, information regarding a funding amount for the first and second payment accounts. The account management circuit is also configured to receive, by the network interface, information regarding a first expense of the customer. The account management circuit is also configured to fund the second account with a first portion of the funding amount based on the information regarding the first expense.

Another embodiment relates to a computer-implemented method. The method includes receiving, by a financial institution computing system associated with a financial institution, a customer request to establish an account at the financial institution. The method also includes creating, by the financial institution computing system, in response to receiving the customer request, first and second checking accounts for the customer, the first checking account having a payment card associated therewith, the second checking account not having any payment cards associated therewith. The method also includes receiving, by the financial institution computing system, information regarding a funding amount for the first and second payment accounts. The method also includes receiving, by the financial institution computing system, information regarding a first expense of the customer. The method also includes funding, by the financial institution computing system, the second account with a first portion of the funding amount based on the information regarding the first expense.

Another embodiment relates to a computer-implemented method. The method includes receiving, by a mobile device, a first input from a customer indicating a spending limit for the customer over a predetermined period. The method also includes receiving, by the mobile device, an indication of a deposit of an amount of funds into a first customer checking account. The method also includes determining, by the mobile device, a first portion of the amount of funds that is to be allocated towards the first checking account of the customer based on the spending limit. The method also includes presenting, by the mobile device, a first graphical user interface to the customer, the graphical user interface including a representation of the first portion and a representation of a second portion of the amount of funds allocated to a second checking account of the customer.

BRIEF DESCRIPTION OF THE DRAWINGS

FIGS. 3A-3M are graphical user interfaces presented to a customer during a registration for a personalized checking account, according to various example embodiments.

FIGS. 5A-5K are graphical user interfaces enabling a customer to manage an account, according to various example embodiments.

FIGS. 7A-7F are graphical user interfaces presented to a customer to assist the customer in the management of funds, according to various example embodiments.

FIGS. 9A-9D are graphical user interfaces configured to notify the customer of a recommendation, according to various example embodiments.

DETAILED DESCRIPTION

Figure 1:
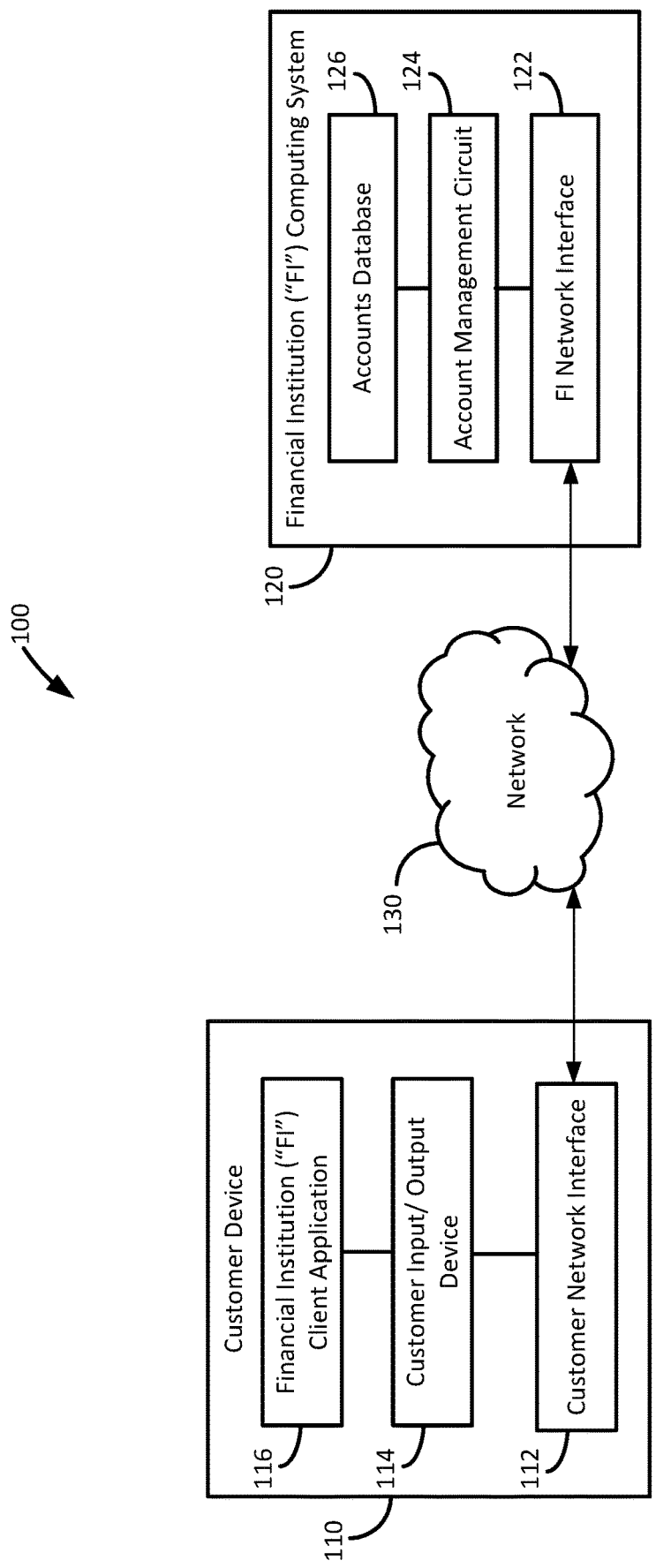
FIG. 1 is a block diagram of an account management system, according to an example embodiment.

Before turning to the figures, which illustrate example embodiments, it should be understood that this application is not limited to the details or methodology set forth in the following description or illustrated in the figures. It should also be understood that the phraseology and terminology employed herein is for the purpose of description only and should not be regarded as limiting.

Various embodiments discussed herein relate to systems and methods for providing customers with personalized financial accounts. In various embodiments, a customer of a financial institution downloads and installs a native application onto their device (e.g., a smartphone). Upon installation on the customer device, the native application is structured to cause the customer device to present the customer with a series of registration interfaces configured to receive information from the customer and transmit the information to a financial institution computing system associated with a financial institution. Using the information, the financial institution computing system verifies the customer and generates two or more checking accounts for the customer. In an example implementation, the financial institution computing system generates two checking accounts for the customer: a customer spending account and a customer reserve account. In such an implementation, the customer spending account has a payment card associated therewith while the customer reserve account does not have a payment card associated therewith. In various embodiments, the financial institution computing system is configured to receive additional information regarding a funding amount for the spending and reserve accounts as well as expenses of the customer. Based on the expenses of the customer, the financial institution computing system allocates customer funds between the customer spending account and the customer reserve account.

Additionally, the native application on the customer device is configured to make recommendations to the customer based on the allocation of the customer's funds and the customer's financial behaviors. For example, the financial institution computing system may monitor the customer's utilization of funds allocated to the customer's spending account (e.g., an average amount the customer spends per week) to determine that the customer's spending is below a predetermined threshold (e.g., a spending limit previously established by the customer). In response to making such a determination, the financial institution computing system may provide a recommendation that the customer set aside some funds for investment or savings. As such, the systems and methods herein provide personalized recommendations based on the customer's individual spending behaviors.

The embodiments and implementations of the systems and methods disclosed herein propose a novel account registration and activation sequence in which a customer is able to establish multiple checking accounts by providing a single input to a financial institution computing system. Technically and beneficially, such a multi-account structure facilitates the presentation of various graphical user interfaces to the customer enabling the customer to monitor and manage the customer's finances. To illustrate, a graphical user interface may include a first portion including a representation of a current funding level of the customer spending account in relation to a spending limit provided by the customer and a second portion indicating a funding level of the customer reserve account. As such, the customer is made aware of both the customer's current spending level as well as a total amount of funds available in an understandable manner.

Additionally, such a multi-account structure facilitates the financial institution providing guidance to improve the financial health of the customer. In various embodiments, the customer's access to funds placed in the customer reserve account is restricted. For example funds placed in the customer reserve account may only be available for payment of a certain subset of customer expenses (e.g., the customer's utility bills). These restrictions ensure that a consistent amount of customer funds remain available for the payment of such customer expenses. Additionally, such a process facilitates the presentation of expense information to the customer. For example, on a graphical user interface, each customer expense may have a payment envelope associated therewith. Each envelope may include an amount owed by the customer by a certain date as well as an adjustable allocation amount. In various embodiments, the systems and methods disclosed herein provide suggested allocation amounts to the customer and dynamically update the envelopes in accordance with allocation inputs provided by the customer. As such, the systems and methods herein provide a unique platform for customers to micro-manage both incoming funds and expenses.

Referring now to FIG. 1, a block diagram of an account management system 100 is shown, according to an example embodiment. The account management system 100 includes a customer device 110 associated with a customer. The customer may be an individual or any other entity capable of opening up an account at a financial institution. The account activation system 100 further includes a financial institution computing system 120 associated with the financial institution. The financial institution may include commercial or private banks, credit unions, investment brokerages, or the like. Various components of the account management system 100 are configured to communicate with one another over a network 130. The network 130 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 130 includes the internet. As described herein, the account management system 100 may be used to enable the customer to establish and fund accounts at the financial institution, engage in various transactions using the established accounts, and receive financial guidance.

The customer device 110 is a computing device associated with the customer. In various embodiments, the customer may utilize the customer device 110 to register for accounts at the financial institution and view various graphical user interfaces containing information pertaining to the customer's accounts. Examples of the customer device 110 include, for example, personal computing devices such as a desktop or a laptop computer, and mobile computing devices such as smartphones, tablets, and wearable computing devices such as smartwatches and the like.

In the example shown, the customer device 110 includes a customer network interface 112 configured to communicate data over the network 130, a customer I/O device 114, and a financial institution client application 116. The customer I/O device 114 includes hardware and associated logics configured to enable the customer device 110 to exchange information with a customer (e.g., via a touch display, microphone, camera) and other devices. The customer I/O device 114 may include systems, components, devices, and apparatuses that serve both input and output functions, configured to exchange information with external systems (e.g., merchant point of sale devices, computing devices associated with other individuals). Such systems, components, devices and apparatuses include, for example, radio frequency transceivers (e.g., RF or NFC-based transceivers) and other short range wireless transceivers (e.g., Bluetooth©, laser-based data transmitters, etc.).

The financial institution client application 116 is structured to enable the customer to establish and manage financial accounts. Accordingly, the financial institution client application 116 is communicably coupled via the customer network interface 112 over the network 130 to the financial institution computing system 120. In some embodiments, the financial institution client application 116 includes a circuit embodied within the customer device 110. For example, the financial institution client application 116 may include program logic stored in a system memory of the customer device 110. In such arrangements, the program logic may configure a processor of the customer device 110 present the user with various graphical user interfaces based on information regarding customer accounts. In some embodiments, the financial institution client application 116 is at least partly web-based. As will be understood, the level of functionality that resides on the customer device 110 versus the financial institution computing system 120 will vary depending on the implementation.

In some embodiments, the displays presented to the customer via the financial institution client application 116 are configured to receive information from the customer to establish an account at the financial institution. Examples of such interfaces are described in more detail with respect to FIGS. 3A-3I. Additionally, the displays also include information pertaining to the status of the customer's accounts. For example, the displays may include account balance information, customer spending limit information, information regarding expenses of the customer (e.g., customer bill payments), and allocations of customer funds between the customer spending account and the customer reserve account. Examples of such interfaces are described below with respect to FIGS. 5A-5D and FIGS. 7A-7G below.

In some embodiments, the financial institution client application 116 includes program logic configured to cause the customer device 110 to process and manipulate customer financial data received from the financial institution computing system 120 over the network 130. For example, in response to funds being deposited into the customer's spending account, the financial institution computing system 120 may transmit updated account balance information to the customer device 110. In response, the customer device 110, via the financial institution client application 116, may manipulate such information using predetermined parameters to determine an allocation of the deposited funds between the customer spending account and the customer reserve account. In some arrangements, the allocation is based on preferences indicated by the customer. In some arrangements, the allocation is a default allocation determined by the financial institution. For example, the customer device 110 may allocate an amount of the deposited funds into the customer spending account that corresponds to a spending limit established by the customer and the remainder of the funds into the customer reserve account.

In some embodiments, the financial institution client application 116 includes an allocation algorithm, process, method, and/or other type of control framework configured to cause the processor of the customer device 110 to allocate customer funds placed into the customer reserve account among various expenses of the customer. For example, the customer device 110 may receive (e.g., from the financial institution computing system 120) information regarding bills (e.g., rent, utility bills, service provider bills) of the customer describing various amounts owed by the customer to recipients by predetermined dates. The allocation algorithm may include a prioritization scheme that designates portions of available funds to each customer bill based on the amount and due date of each payment. Additionally, such an allocation may be used to present the customer with a payment interface configured to present the customer with depictions of upcoming payments owed by the customer and configured to receive inputs from the customer to make such payments in accordance with the allocation.

The financial institution client application 116 may also include monitoring logic configured to track the customer's utilization of accounts and provide recommendations to the customer in response to the detection of certain patterns. For example, such monitoring logic may cause the customer device 110 to compare an amount of customer spending over a predetermined period to a spending limit established by the customer. If the customer's spending level is below the spending limit by more than a first threshold for a predetermined percentage of periods (e.g., weeks, months), for example, the customer may be presented with a suggestion to set aside funds for investment. Alternatively, if the customer's spending level is consistently above the spending limit, the customer may be presented with suggestions on how to reduce spending levels.

In some embodiments, the customer device 110 includes a mobile wallet application (not shown) structured to facilitate and permit payments by interfacing with various accounts held by the customer (e.g., including accounts established via the financial institution client application 116). The mobile wallet client application is structured to permit the customer to engage in transactions via communication with, for example, a merchant point of sale ("POS") device via an established communication channel (e.g., near field communications) in accordance with any known standard.

The financial institution computing system 120 is a computing system associated with the financial institution configured to establish and maintain customer accounts. In the example shown, the financial institution computing system 120 includes a network interface 122 configured to communicate data over the network 130, an account management circuit 124, and an accounts database 126. The accounts database 126 is structured to retrievably store information pertaining to accounts held by a number of customers at the financial institution. The accounts database 126 may include non-transient data storage mediums (e.g., local disc or flash-based hard drives, local network servers) or remote data storage facilities (e.g., cloud servers). The accounts database 126 may include personal customer information (e.g., names, addresses, phone numbers), identification information (e.g., driver's license numbers, standard biometric data), and customer financial information (e.g., token information, account numbers, account balances, available credit, credit history, transaction histories).

The account management circuit 124 is configured to create, hold or store, and manage the financial accounts of various customers. In some instances, such management includes maintaining and handling transaction processing for various customer accounts. In some embodiments, the financial institution client application 116 is at least partly provided by the account management circuit 124. In this regard, the account management circuit 124 is configured to communicate information utilized by the customer device 110 to render the various interfaces described herein to the customer. Such information may include, for example, customer account balance information, information regarding customer deposits into the accounts, upcoming payments owed by the customer to various entities, and suggested allocations of customer funds. For example, in some embodiments, the account management circuit 124 performs the operations discussed above with respect to the customer device 110 to allocate customer funds between the customer spending and reserve accounts and allocate customer funds among payments owed by the customer.

In various embodiments, the account management circuit 124 is configured to approve the customer for a checking account at the financial institution based on information gathered from the customer via the financial institution client application 116. For example, the account management circuit 124 may communicate with various external computing systems (e.g., credit bureaus, public databases, social media databases) to verify the identity of the customer and determine that the customer is eligible for an account at the financial institution. In response to determining that the customer is eligible, the account management circuit 124 may generate at least two checking accounts (e.g., the customer reserve account and the customer spending account) for the customer.

In this regard, the account management circuit 124 may assign a primary account number and a secondary account number to the customer. For example, the account management circuit 124 may maintain a queue of account numbers that are yet to be assigned to any customers of the financial institution. In response to determining the eligibility of the customer for an account, the account management circuit 124 may designate two such account numbers for the customer. Alternatively, the account management circuit 124 may utilize a random number generator to generate the primary and secondary account numbers for the customer in real time in response to the customer's approval. The primary account number may be associated with the customer reserve account and may be used by the customer to identify an account to which future deposits are to be made. The secondary account number may be associated with the customer spending account. In alternative embodiments, the primary account number (i.e., the account number that the customer uses to deposit funds) may be associated with the customer spending account rather than the customer reserve account. As described herein, the account management circuit 124 may allocate various deposits made by the customer between the customer spending account and the customer reserve account.

In various embodiments, the customer spending account has a payment card (e.g., a debit card, an Automated Teller Machine card) associated therewith. Accordingly, the account management circuit 124 may also generate a card number (e.g., in accordance with the ISO/JEC 7812 standard) for the customer spending account and transmit the card number to a card network computing system to have additional parameters (e.g., the card verification value) associated with the card number. Once all of these parameters are associated with the card number have been generated, the account management circuit 124 may initiate a sequence to generate a physical payment card containing such parameters and send the physical payment card to the customer.

In some embodiments, then, the customer's primary account number is associated with the customer reserve account, while the customer's payment card is associated with the customer spending account. Put differently, the account to which the customer deposits funds is separated from a mechanism (the payment card) through which the customer withdraws funds. Such an arrangement beneficially facilitates limiting the customer's spending. Since the customer's deposits are routed to the customer reserve account, portions of the deposits must then be transferred to the customer spending account to render funds available for everyday customer spending. The requirement of such transfers encourages the customer to establish the customer spending limit as, in some embodiments, the customer spending limit is tied to a periodic transfer between the customer reserve account and the customer spending account. Additionally, these transfers create opportunities to notify the customer about other additional aspects of the customer's finances. As described herein, to transfer funds to the customer spending account, the customer must view graphical user interfaces that display information regarding other payment obligations of the customer. As such, the customer is made aware of the context in which additional spending is taking place.

In some embodiments, the account management circuit 124 is configured to digitally activate the payment card in response to receiving a customer preference/input to activate the account. In some embodiments, the customer may provide such an input upon receiving the physical payment card by, for example, calling or otherwise contacting the financial institution. In some embodiments, the customer may provide such an input by indicating a preference to provision the customer spending account to a mobile wallet of the customer.

In some embodiments, the account management circuit 124 is configured to communicate with various external computing systems regarding transfers of funds into and out of the customer's spending and reserve accounts. For example, the customer may provide information (e.g., via a digital form or the like) regarding the customer spending account to an entity (e.g., an employer) from which the customer is to receive a periodic payment. The entity may electronically (e.g., via an Automated Clearing House transaction) transfer funds into the customer spending account via the network 130. Additionally, in various embodiments, the customer may provide information regarding various expenses of the customer. For example, the customer may provide information regarding various accounts (e.g., billing accounts) held by the customer at external entities (e.g., landlords, utilities, other service providers). In response, the account management circuit 124 may formulate requests to have the external entities (e.g., via associated computing systems) provide digital or e-bills to the financial institution computing system 120. Upon a customer payment becoming due or the customer indicating a preference to make a payment, the financial institution computing system 120 may transfer funds from the customer reserve account to an external entity associated with the payment.

Figure 2:
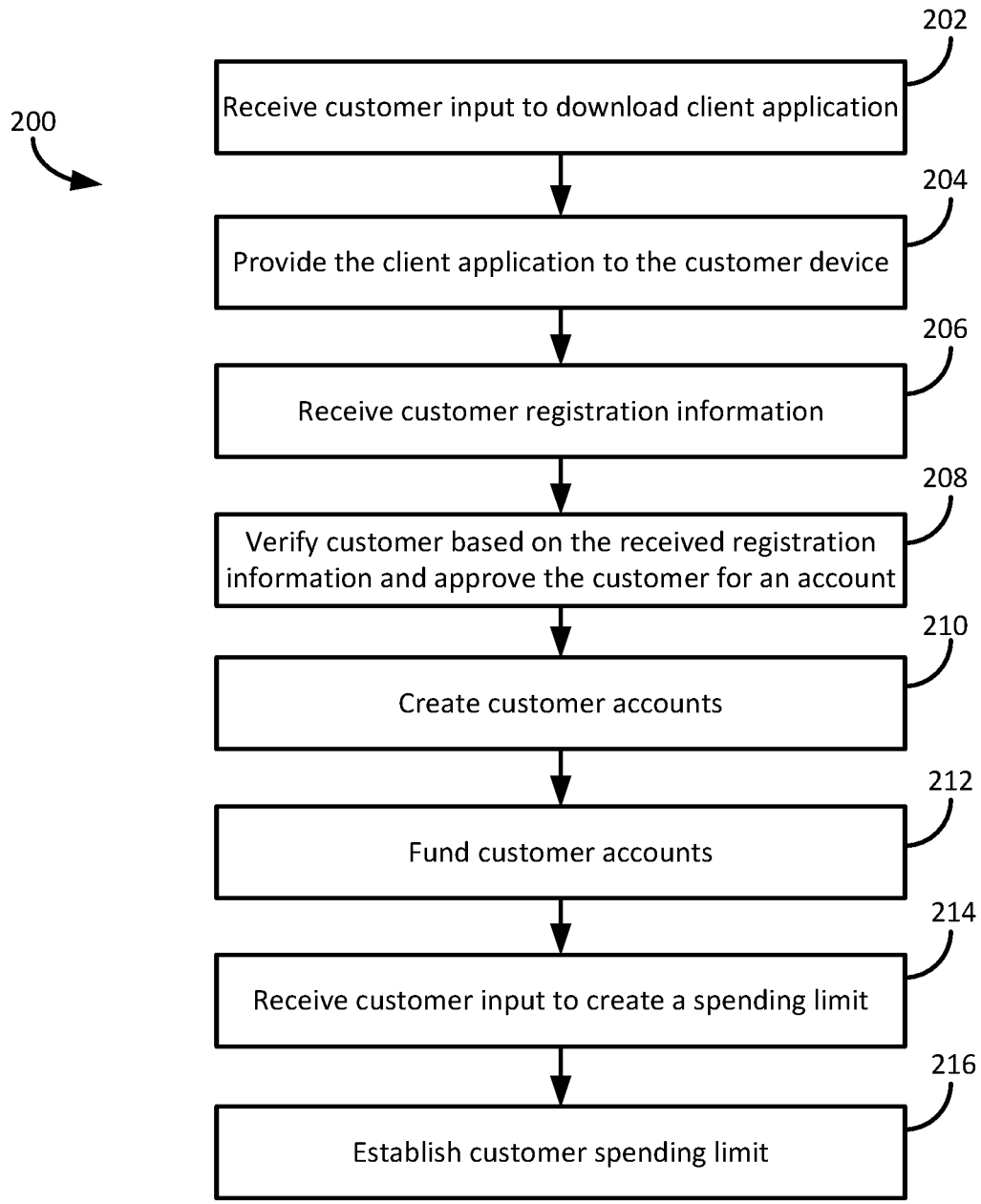
FIG. 2 is a flow diagram of a method of creating a personalized checking account for a customer, according to an example embodiment.

Referring now to FIG. 2, a flow diagram of a method 200 of creating a personalized checking account for a customer is shown, according to an example embodiment. The method 200 may be performed by the components of FIG. 1, such that reference may be made to one or more components of FIG. 1 to aid description of the method 200. In various embodiments, the method 200 may be executed to enable a customer to establish a new account at the financial institution via the customer device 110 and to provide a personal input regarding the new account (e.g., a spending limit). Technically and advantageously, such a process alleviates the need for the customers to physically visit the financial institution, hastens the enrollment process for a new account, and provides an integrated process for a customer to both register for an account and received personalized financial guidance.

At process 202, a customer input to download the financial institution client application 116 is received. For example, in some embodiments, the customer may utilize a web browser on the customer device 110 to access a website provided by the financial institution computing system 120 and provide an input to download the financial institution client application 116. Alternatively or additionally, the customer may provide such an input via an application (e.g., an application store) on the customer device 110.

At process 204, the financial institution client application 116 is transmitted to the customer device 110. For example, in some embodiments, the account management circuit 124 may transmit the financial institution client application 116 to the customer device 110 in response to the customer providing the input received at process 202 from the financial institution website. Alternatively, an external server (e.g., associated with the application store) may transmit the financial institution client application 116 to the customer device 110, register the customer device (e.g., assign a unique identifier to the customer device), and provide the unique identifier and customer identifying information (e.g., a customer name) to the financial institution computing system 120, which may create an entry for the customer in the accounts database 126 (or another database).

In some embodiments, upon the customer initiating the financial institution client application 116 on the customer device 110, the financial institution client application 116 cause the customer device 110 to present the customer with a number of registration interfaces configured to receive information from the customer needed to establish a checking account. Examples of such interfaces are described with respect to FIGS. 3A-3H. Upon the customer entering the requested information, the financial institution client application 116 causes the customer device 110 to transmit the provided information to the financial institution computing system 120 over the network 130. The account management circuit 124 receives the customer provided information at process 206.

At process 208, the account management circuit 124 verifies the customer based on the received registration information and approves the customer for an account at the financial institution. In some embodiments, the account management circuit 124 takes various steps to verify the identity of the customer. For example, if an image of a form of customer identification is received, the account management circuit 124 may verify the authenticity of the form of identification by assessing, analyzing, or otherwise determining the image for various authenticity signatures (e.g., logos, markings, coloring schemes) associated with a legitimate form of customer identification. Additionally, the account management circuit may verify the identity of the customer based on a phone number provided by the customer (e.g., via communications with an external service provider maintaining a database of registered phone numbers). Additionally, the account management circuit 124 may query various external databases (e.g., public databases, databases maintained by credit bureaus) to determine the customer's eligibility for an account. As used herein, the term "eligibility," when used in relation to determining whether to open an account for a customer, refers to a set of qualifications that must be met in order the opening of an account to take place. Such qualifications may be established by the financial institution. For example, one such qualification is that the customer is not on any blacklists of known bad actors, as required by the Customer Identification Program. Another may be that the customer does not have a history of fraud, and/or has a credit score that is above a threshold. Any qualification used in determining whether to open an account for a customer is consistent with this term.

At process 210, in response to determining that the customer is eligible for an account, the account management circuit 124 may establish a number of checking accounts for the customer. In an example implementation, the account management circuit establishes two checking accounts for the customer: a customer reserve account and a customer spending account. In such an implementation, the account management circuit 124 may generate (i) a primary account number to be associated with the customer reserve account, (ii) a secondary account number to be associated with the customer spending account, and (iii) a payment card number for the customer. Additionally, the account management circuit 124 may store the generated account numbers in the accounts database 126 in association with the registration information obtained from the customer.

The generation of multiple checking accounts in response to a single account registration input represents a departure from conventional practices. Typically, account opening procedures only enable the customer to establish a single checking account as well as potentially a savings account. Such an account structure places limitations on the types of services that can be provided for the customer. Financial institutions are generally limited in their ability to restrict access to the customer's funds in traditional checking accounts (e.g., as long as the customer maintains a balance above a limited threshold, the customer may withdraw funds from the checking account at will). This makes it difficult for financial institutions to allocate funds in the customer's checking account, as there is little to no reliability in the account balance information. Additionally, the customer's ability to transfer funds from a typical savings account is heavily restricted (e.g., the bank may limit the customer's ability to withdraw funds). As such, any funds placed into the customer's savings accounts are generally unavailable for use in many types of transactions. Put differently, the customer's access to funds is basically binary: either the customer has total access to funds (when in the checking account), or limited access to funds (when in the savings account). Such a difference in accessibility may lead to the customer over-allocating funds to the customer checking account (so as to render more funds immediately available), which may facilitate negative customer spending habits (e.g., over spending and lack of saving).

Technically and beneficially, the systems and methods disclosed herein, by effectively replacing the savings account with an additional checking account, facilitates the financial institution immediately providing an array of financial services to the customer. For example, the customer may generally have unrestricted access to funds placed in the customer spending account. While access to funds placed in the customer reserve account is generally more restricted than in a traditional checking account, such funds may be used for more purposes than those deposited in savings accounts. For example, in various embodiments, funds in the customer reserve account may only be used for transactions meeting certain rules established by the financial institution. To illustrate, the financial institution may maintain a directory of payees (e.g., service providers) to which funds in customer reserve accounts may be transferred. The presence of this particularized account including funds that may be provided to a designated set of payees encourages the customer to set aside funds into the account, thereby ensuring that customer funds are available for the payment of certain customer expenses.

In various embodiments, to utilize the funds placed in the customer reserve account for purposes other than making payments to the designated set of payees, the customer must transfer funds to the customer spending account from the customer reserve account. However, because funds placed in the customer reserve account are allocated amongst various customer payments (e.g., as described with respect to FIG. 6), the requirement of such a transfer creates an opportunity to notify the customer of upcoming payments owed by the customer to the designated set of payees. This encourages the customer to maintain a high enough balance in the customer reserve account in order to timely make such payments, which in turn facilitates a low variability in the balance of the customer reserve account. Such a low variability enables to the financial institution to reliably and accurately allocate funds to various customer payment obligations. As such, the multi-checking account structure disclosed herein provides a convenient and effective platform for customer fund management.

At process 212, the account management circuit 124 funds the customer spending account and the customer reserve account. In one embodiment, the registration interfaces described above may request the customer to input information regarding an account to be used by the customer to provide an initial deposit into the customer's new account. Using such information, account management circuit 124 may formulate a transaction request including a deposit amount (e.g., provided by the customer via a registration interface) and the account number provided by the customer and transmit the request to another financial institution via the network 130. The other financial institution may approve the transaction and authorize the financial institution computing system 120 to transfer funds to the customer's new account. Thus, this embodiment describes an electronic money transfer process that is used to fund the customer's account. While this is the preferred embodiment, in another embodiment, a non-electronic transfer may be used. In this implementation, a funding amount of the customer is withdrawn from the customer's existing account. The withdrawn amount may be in the form of a check, cashier's check, cash, and the like. In this instance, the user may have to visit a branch location, upload, or otherwise use these funds to fund the new account. Of course, the financial institution client application 116 may use a check deposit feature (e.g., snap a picture of the check) to alleviate the customer's need to go to the branch location and enable a remote sign-up process.

In some embodiments, as a default, the totality of the initial deposit is placed into the customer spending account. This way, upon the customer activating the payment card associated with the spending account, a substantial amount of the initial deposit (e.g., the amount of the initial deposit less a mandatory minimum balance set by the financial institution) is available for use by the customer. In an alternative embodiment, the totality of the initial deposit is placed into the customer reserve account and all or a portion of the initial deposit is transferred to the customer spending account upon receiving an additional input from the customer (e.g., the customer providing a spending limit). This way, the customer is prevented from utilizing the initial deposit until a spending limit is established, thereby encouraging the customer to establish a spending limit and take full advantage of the financial guidance provided via the financial institution client application 116.

At process 214, the account management circuit 124 receives a customer input to create a spending limit. For example, upon approving the customer for an account at process 208, the financial institution computing system 120 may transmit a notification signal, communication, or message to the customer device 110 (e.g., a text message, an email, a notification generated and provided via the client application, etc.) which, in response, may present account management interfaces to the customer. The account management interfaces may enable the customer to establish a spending limit with respect to the customer's new account. Upon the customer indicating a preferred spending limit over a predetermined period, the account management circuit 124 establishes the spending limit at process 216 by storing the provided limit in association with the customer's account. As described herein, the spending limit may be utilized in determining amounts to be allocated to the customer spending account and the customer reserve account, and to provide recommendations to the customer.

In various embodiments, funds placed in the customer reserve account are generally set aside for a subset of payments (e.g., bills) owed by the customer and/or other financial goals of the customer such as savings funds. As such, payments made by the customer in relation to other transactions (e.g., at a brick-and-mortar or an online merchant) are generally deducted from the customer spending account. Given this difference in the intended use of funds placed in either account, the customer's access to funds placed in the customer reserve account is generally more restricted than the customer's access to funds placed in the customer spending account. For example, in one embodiment, funds placed in the customer reserve account are unavailable for general use unless the balance of the customer spending account is below a predetermined amount (e.g., the amount of a transaction requested received by the financial institution computing system 120). In another embodiment, funds in the customer reserve account are unavailable for use in general transactions unless the customer authorizes a transfer between the customer spending account and the customer reserve account.

Given this difference in availability of customer funds placed in customer spending and reserve accounts, the initial allocation of funds between the spending and reserve accounts determines the immediate availability of the funds. As described herein, this initial allocation may be done in a number of different ways. For example, in one embodiment, the customer may select an option wherein any available customer funds exceeding the customer spending limit are placed into the customer reserve account to facilitate the customer spending below the spending limit. In another embodiment, the customer may select another option that allocates any available customer funds exceeding a total amount of upcoming payments owed by the customer (e.g., received via the method 400 described in relation to FIG. 4) to the customer spending account to maximize the amount of funds available for general use.

In some embodiments, the account management circuit 124 utilizes the customer spending limit to establish a transaction rule or rule set for the customer's spending account. In some embodiments, the account management circuit 124 utilizes the transaction rule set in the process of approving customer transactions using the customer spending account. For example, in response to receiving a request to deduct funds from the customer spending account (e.g., from a merchant computing system over the network 130), the account management circuit 124 may add an amount in the request to an amount spent by the customer within a predetermined period (e.g., a week). In some embodiments, if the summation of the amounts is above the spending limit, the account management circuit 124 denies the transaction request. In some embodiments, if the summation of the amounts exceeds the spending limit, the account management circuit 124 transmits a notification to the customer device 110 and requests approval from the customer prior to allowing the merchant to deduct the funds.

In some embodiments, the account management interfaces identify other cards that the customer wishes to associate with the new account (hereafter referred to as "companion cards"). For example, the customer may input information regarding a card associated with another customer or another account at the financial institution that the customer wishes to use in concert with the payment card associated with the new account. In response to receiving such information, the account management circuit 124 may determine if the provided account information pertains to an account belonging to another customer. If the customer identifies an account owned or partly owned by another customer, the account management circuit 124 may seek permission from the other customer (e.g., by sending a message via a mobile banking application or e-mail). Upon the other customer providing permission, the account management circuit 124 may crosslink the customer's new account (e.g., the customer spending account) with the account of the other customer.

Through such crosslinking of accounts, financial advising tools (e.g., such as spending alerts) established by the customer with respect to the new account also apply to the crosslinked account. In an example, if, via the methods described herein, the customer establishes a $100 spending limit for the new customer account and identifies another companion card, the spending limit applies to the amount spent using both the customer's new account as well as the companion card. As such, the systems and methods disclosed herein enable related customers to manage combined spending even if one of the accounts was not created via the financial institution client application 116.

Additionally, the account management interfaces may also enable the customer to provide an input to provision the payment card associated with the customer's new account to a digital or mobile wallet. For example, the financial institution client application 116 may include a deep linking feature configured to activate a mobile wallet client application (e.g., a mobile wallet client application provided by the financial institution associated with the financial institution computing system 120, or other external mobile wallet providers such as Apple Pay®, Android Pay®, and/or Samsung Pay®) on the customer device 110 in response to the customer indicating a preference to provision the payment card to the mobile wallet. From within the mobile wallet application the customer may provide information relating to the payment card associated with the customer's new account, thereby causing the mobile wallet provider to tokenize the payment card and provision the payment card to the customer's mobile wallet. Beneficially, this linking enables the customer to engage in transactions using the payment card via the customer device 110. Example account management interfaces are described with respect to FIGS. 3I-3J.

Figures 3A, 3B:
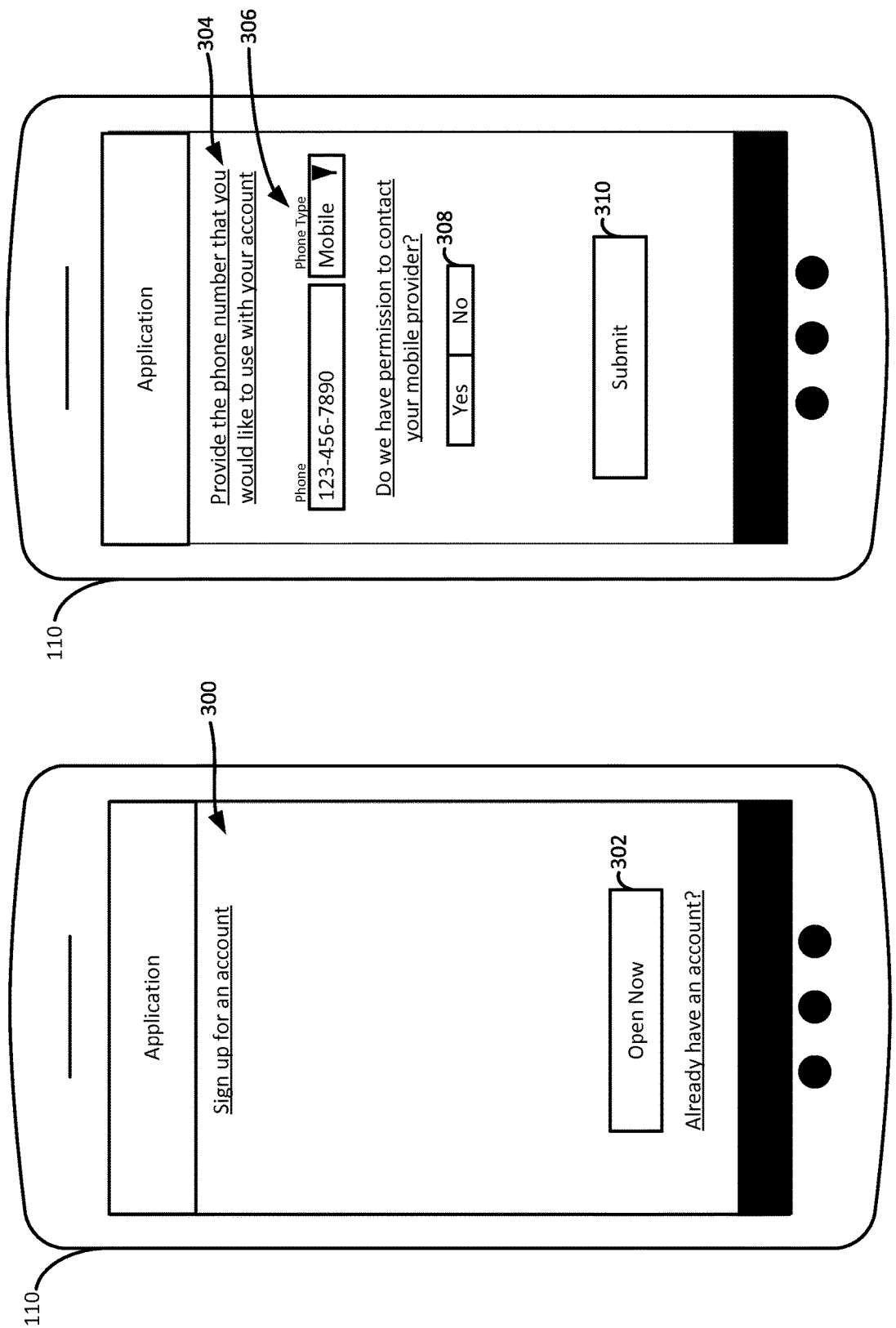

Referring now to FIGS. 3A-3J, a number of graphical user interfaces presented to the customer via the financial institution client application 116 are shown, according to an example embodiment. FIGS. 3A-3H show a plurality of graphical user interfaces configured to receive registration information from the customer. FIG. 3A shows an account opening graphical user interface 300 configured to receive a customer input to establish an account at the financial institution associated with the financial institution computing system 120, according to an example embodiment. The account opening graphical user interface 300 includes an account opening button 302 configured to receive a customer input to open an account and initiate a registration sequence for the account.

FIG. 3B shows an information gathering graphical user interface 304, according to an example embodiment. The information gathering graphical user interface 304 includes a mobile device data field 306 configured to receive a phone number of a mobile device, a permission field 308, and a submission button 310. The permission field 308 is configured to receive permission to contact a network service provider to provide the customer with access to a network via the mobile device. In various embodiments, upon the customer entering a mobile number, providing permission, and hitting the submission button 310, the phone number is transmitted to the financial institution computing system 120, which may utilize such information to verify the identity of the customer. For example, the account management circuit 124 may formulate a request via an application programming interface to request information regarding the provided phone number from an external computing system (e.g., a mobile provider). Using information returned by the external computing system, the account management circuit 124 may verify the identity of the customer (e.g., by comparing a name returned by the external computing system to a name provided by the customer).

FIG. 3C shows another information gathering graphical user interface 312 according to an example embodiment. The information gathering graphical user interface 312 includes a social security number field 314 configured to receive a social security number input from the customer and a verification button 316. In some embodiments, upon the customer providing a social security number and selecting the verification button 316, the provided social security number is transmitted to the financial institution computing system 120 and used by the account management circuit 124 to determine the customer's eligibility for an account. For example, the account management circuit 124 may utilize the social security number to request a credit report regarding the customer and assess the information in the credit report against predetermined parameters to determine the customer's eligibility for an account.

FIG. 3D shows an additional information gathering graphical user interface 318 according to an example embodiment. The information gathering graphical user interface 318 includes a photo capture button 320 and a submission button 322. The photo capture button 320 is configured to receive an input to capture a photo of a piece of customer identification such as a driver's license or passport. In response to the customer providing such an input (e.g., by pressing the photo capture button 320), the financial institution client application 116 causes a processor of the customer device 110 to activate a camera on the customer device 110. Additionally, the customer is presented with an interface that shows the view of the camera and includes additional instructions for capturing the image (e.g., the interface may include an outline shape of a piece of identification and prompt the customer to line the piece of identification up within the outline prior to capturing an image). When the customer lines the piece of identification up within the viewing angle of the camera, the camera automatically captures an image of the customer identification. The customer device 110 then transmits (e.g., in response to the customer selecting the submission button 322) the captured image over the network 130 to the financial institution computing system 120. In some embodiments, multiple images of the customer's identification are requested (e.g., of both the front and the back of the customer's identification). In some embodiments, a video of the customer identification is captured.

FIG. 3E shows an example information verification graphical user interface 324. In the example shown, the information verification graphical user interface 324 includes a customer information window 326 and an amendment button 328. The customer information window 326 contains various fields for various items of information gathered from the customer. The amendment button 328 enables the customer to amend the information to be used to create the new account. For example, a customer's preferred address may vary from the address extracted from the captured image of the customer's identification, and the customer may amend the address to a more preferred address. In some embodiments, the financial institution computing system 120 utilizes updated information entered by the customer after pressing the amendment button 328 to verify the identity of the customer and approve the customer for a new account.

FIG. 3F shows an example verification image graphical user interface 330. The verification image graphical user interface 330 instructs the customer to capture an image of the face of the customer via a photo capture button 332 (e.g., similar to the photo capture button 320 discussed with respect to FIG. 3D) and a submission button 334. In various embodiments, the verification image graphical user interface 330 instructs the customer to capture an image, sequence of images, or video of the customer performing a predetermined action (e.g., of the customer blinking, of the customer performing a predetermined pose or gesture) to verify that the verification image was captured in real-time. Upon the customer capturing an image or video and selecting the submission button 334, the financial institution client application 116 may cause the customer device 110 to transmit the captured image to the financial institution computing system 120 over the network 130. Upon receipt of the verification image, the account management circuit 124 may compare the verification image to a portion of the image of the piece of identification containing the customer's face to verify the identity of the customer.

FIG. 3G shows an example account funding graphical user interface 336. The account funding graphical user interface 336 is configured to receive information regarding a payment account that the customer intends to use to fund the new account at the financial institution. In this regard, the account funding graphical user interface 336 includes a photo capture button 338 configured to receive a user reference to capture a photo of a check or a payment card and a manual input button 340 configured to receive a customer preference of the customer to manually enter information (e.g., an account number) associated with an account used to fund the customer's new account. The account management circuit 124 may utilize such information to transfer funds to the customer spending account and the customer reserve account. Of course, in other embodiments, the relevant existing account information may be entered manually and without the use of photo-capture and analysis processes.

FIG. 3H shows an example account access credential graphical user interface 342. In the example shown, account access credential graphical user interface 342 includes a credential window 344 and an enrollment button 346. The credential window 344 includes various fields for enabling the customer to establish login credentials to access the new account. The enrollment button 346 enables the customer-input credentials to be transmitted to the financial institution computing system 120 over the network 130 and stored in the accounts database 126 in association with the newly-created customer account.

Referring now to FIG. 3I, an example account action graphical user interface 348 is shown. In various embodiments, the account action graphical user interface 348 is presented to the customer upon the customer device 110 receiving an indication that the customer has been approved for an account at the financial institution. Alternatively, the account action graphical user interface 348 may be presented to the user immediately after the customer registers for a new account. In the example shown, the account action graphical user interface 348 includes a companion card button 350, a digital wallet provisioning button 352, and a spending limit button 354. The companion card button 350 is configured to receive a customer preference to identify companion cards that the customer wishes to associate with their new account. The digital wallet provisioning button 352 is configured to receive a customer preference to provision the account established via the method 200 to a digital wallet of the customer. In some embodiments, the financial institution client application 116 includes a mobile wallet widget enabling the customer to engage in transactions using the financial institution client application 116. In such embodiments, a customer selection of the digital wallet provisioning button 352 causes the financial institution computing system 120 to tokenize the card number associated with the customer spending account and render the account available for use within the financial institution client application 116.

In some embodiments, the digital wallet provisioning button 352 enables the customer to provision the customer spending account to mobile wallets provided by external computing systems. In this regard, in response to the customer selecting the digital wallet provisioning button 352, the account management circuit 124 communicates the card number associated with the customer spending account to such external computing systems, which tokenizes the card number to render the card number usable within other mobile wallet applications on the customer device 110. The spending limit button 354 is configured to receive a customer preference to establish a spending limit. The account action interface 348 also includes a skipping button 356 configured to receive a customer input to not perform any of the additional actions.

FIG. 3J shows an example spending limit graphical user interface 358. In various embodiments, the customer may be presented with the spending limit graphical user interface 358 upon selecting the spending limit button 354 discussed with respect to FIG. 3I. In the example shown, the spending limit graphical user interface 358 includes an amount entry field 360, a limit preference indicator 362, and a spending limit establishment button 364. The amount entry field 360 is configured to receive a customer-provided spending limit amount. The limit preference indicator 362 is configured to receive a customer preference as to the period of the spending limit. For example, if the customer enters $100 into the amount entry field 360 and presses a weekly portion of the limit preference indicator 362, the account management circuit 124 establishes a weekly $100 spending limit for the customer. In some embodiments, the spending limit graphical user interface 358 includes a breakdown button 366 configured to receive a customer preference to set categorized spending limits.

Referring now to FIG. 3K, a categorized spending limit graphical user interface 368 is shown, according to an example embodiment. The categorized spending limit graphical user interface 368 may be presented to the customer upon the customer selecting the breakdown button 366 on the spending limit graphical user interface 358 described with respect to FIG. 3J. As shown, the categorized spending limit graphical user interface 368 includes icons 370, 372, 374, 376, 378, and 380. Each of the icons 370, 372, 374, 376, 378, and 380 depicts a category of potential customer spending. In the example shown, the icon 370 depicts spending on groceries, the icon 372 depicts other customer shopping expenses (e.g., clothing and other merchandise), the icon 374 depicts automobile-related expenses (e.g., gasoline, repairs), the icon 376 depicts other customer expenses, the icon 378 depicts customer entertainment expenses, and the icon 380 depicts customer dining expenses. Each of the icons 370, 372, 374, 376, 378, and 380 is selectable by the customer to enable the customer to indicate a periodic (e.g., weekly) amount spent by the customer within the depicted category.

Referring now to FIG. 3L, a categorized spending limit graphical user interface 382 is shown, according to an example embodiment. The categorized spending limit graphical user interface 382 may be presented to the customer upon the customer selecting any of the icons 370, 372, 374, 376, 378, and 380 of the categorized spending limit graphical user interface 368 described with respect to FIG. 3K. As shown, the categorized spending graphical user interface 384 includes a category selection window 384, a numerical entry keyboard 386, and an entry button 388. The category selection window 384 enables the customer to select a category from the categories depicted by the icons 370, 372, 374, 376, 378, and 380 and to input a periodic limit for each category via the numerical entry keyboard 386 and entry button 388. As shown, the category selection window 384 includes a subset of the icons 370, 372, 374, 376, 378, and 380. The customer selects a particular category by positioning a corresponding icon in the center of the category selection window 384. Upon the customer selecting a particular icon, the icon is replaced with an amount input window enabling the user to enter a spending limit for that particular category. The user may scroll through the category selection window 384 to select any of the icons 370, 372, 374, 376, 378, and 380.

Figure 3M:
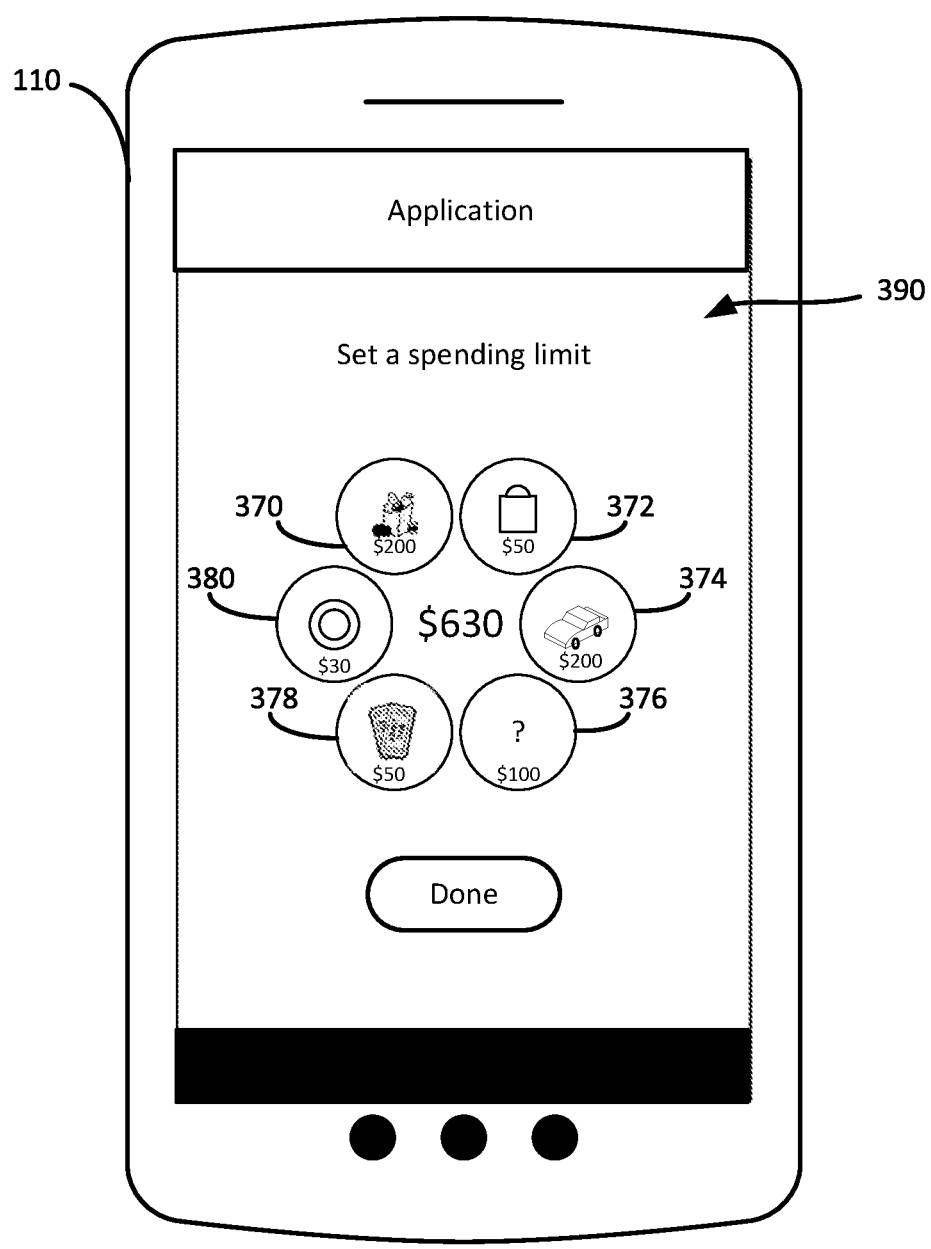

Referring now to FIG. 3M, a finalized spending limit graphical user interface 390 is shown, according to an example embodiment. In one embodiment, the finalized spending limit graphical user interface 390 is presented to the customer upon the customer completing the process of inputting a spending limit for each of the categories depicted by the icons 370, 372, 374, 376, 378, and 380 via the process described with respect to FIG. 3L. As shown, each of the icons 370, 372, 374, 376, 378, and 380 has been updated to include the amounts input by the customer. Additionally, a total spending limit, which is a summation of the spending limits for each of the individual categories, is presented to the customer. In some embodiments, the displayed total spending limit represents a periodic amount that is transferred from the customer spending account and the customer reserve account. For example, each week, an amount corresponding to the total spending limit may be transferred from the customer reserve account into the customer spending account.

Additionally, as described herein, the financial institution computing system 120 or the customer device 110 may track the customer's spending in each of the categories depicted via the icons 370, 372, 374, 376, 378, and 380 to provide insights to the customer as to the customer's level of spending in each category. For example, in some embodiments, the financial institution computing system 120 maintains a directory of merchants that associates a number of different merchants with each of the categories. Upon the customer performing a transaction via the customer spending account, the financial institution computing system 120 accesses the directory and, based on the merchant, categorizes the transaction and updates the customer's transaction history accordingly. This way, the customer may view the transactions conducted in each category.

In some embodiments, the financial institution computing system 120 is configured to deny transaction requests that cause the customer to spend more than a spending limit in a particular category. Alternatively or additionally, in response to receiving such a transaction request, the financial institution computing system 120 may provide a notification to the customer device 110 to seek approval from the customer prior to authorizing such a transaction. This way, not only is the customer potentially prevented from generally spending more than a desired amount, but also prevented from spending more than a desired amount in a particular category.

Figure 4:
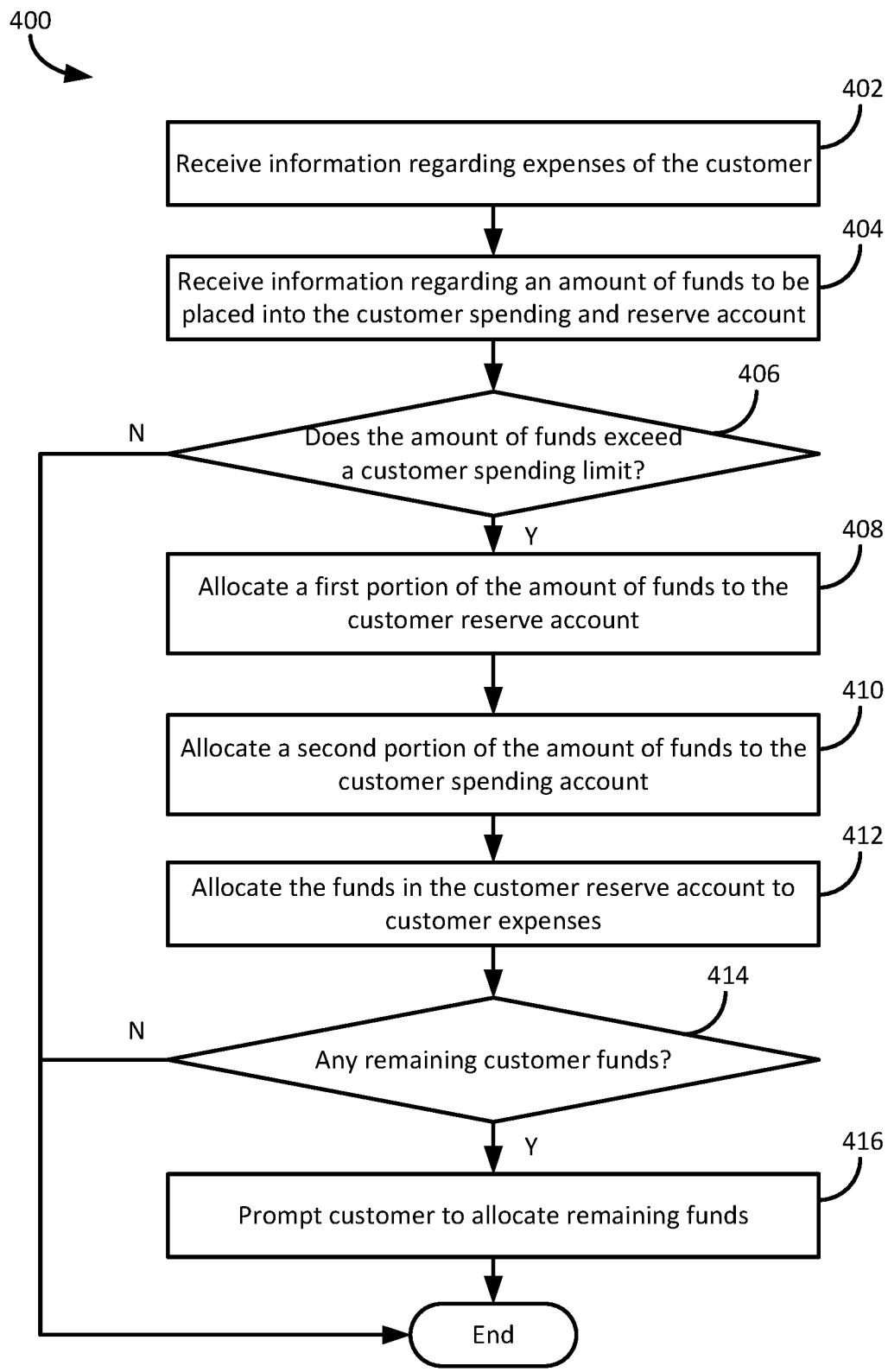
FIG. 4 is a flow diagram of a method of allocating customer funds between a customer spending account and a customer reserve account, according to an example embodiment.

Referring now to FIG. 4, a flow diagram of a method 400 of allocating customer funds between a customer spending account and a customer reserve account is shown, according to an example embodiment. The method 400 may be performed by the components of FIG. 1 such that reference to the components of FIG. 1 may be made to aid the description of the method 400. In various embodiments, the method 400 may be executed via the account management circuit 124 at the financial institution computing system 120 to allocate customer funds between the customer spending account and the customer reserve account established via the method 200 discussed above.

At process 402, the account management circuit 124 receives information regarding one or more expenses of the customer. In some embodiments such information may be received from the customer device 110. For example, in some embodiments, the financial institution client application 116 causes the customer device 110 to present the customer with a graphical interface configured to receive information regarding the customer's bills or any other expenses, which includes recurring and non-recurring expenses. An example of such a graphical user interface is described with respect to FIG. 5A. Via the graphical user interface, the customer may input amounts typically paid by the customer (e.g., a monthly rent payment). Alternatively or additionally, the customer may input the identity of various entities (e.g., landlords, utility companies, service providers) to which the customer owes a payment and input associated account numbers. Upon the customer providing such information, the financial institution client application 116 may cause the customer device 110 to transmit the information to the financial institution computing system 120 over the network 130.

Using such information, the account management circuit 124 may request information the identified entities. For example, using a customer account number associated with a particular service provider, the account management circuit 124 may request an e-bill from a computing system associated with the service provider. The e-bill may contain information regarding a payment owed by the customer such as an amount and due date. In some embodiments, the account management circuit 124 is configured to extract information regarding a payment owed by the customer from the e-bill and transmit such information to customer device 110 to assist in the rendering of various graphical user interfaces described herein.

At process 404, the account management circuit 124 receives information regarding an amount of funds to be placed into the customer spending account and customer the customer reserve account. In some embodiments such information may be received from the customer device 110. For example, in some embodiments, the financial institution client application 116 causes the customer device 110 to present the customer with a graphical interface configured to receive information regarding a deposit into the customer spending account and the customer reserve account. An example of such a graphical user interface is described with respect to FIG. 5B. For example, via such a graphical user interface, the customer may request a form that may be used by an employer of the customer to automatically deposit the customer's paycheck into the customer spending account and the customer reserve account. Alternatively or additionally, such a graphical user interface may be configured to receive information regarding governmental benefits of the customer, which may be used by the financial institution computing system 120 to request that an associated governmental entity directly deposit the governmental benefits into the customer's account. In some embodiments, the customer may deposit funds from an existing bank account of the customer into the customer spending account and the customer reserve account.

At process 406, the account management circuit 124 determines if the amount of funds to be deposited in the account is greater than a customer spending limit (e.g., established via the method 200 described with respect to FIG. 2. In some embodiments, amounts corresponding to the customer's spending limit are automatically allocated to the customer spending account. Accordingly, if the amount to be deposited by the customer does not exceed the customer's spending limit, the account management circuit 124 may allocate deposits completely into the customer spending account and the method 400 ends.

At processes 408 and 410, if the customer has deposited more than the spending limit, the account management circuit 124 is configured to allocate a first portion of the amount of funds to the customer reserve account based on the expense information and allocate a second portion of the amount of funds to the customer spending account. In some embodiments, the account management circuit 124 is configured to initially allocate an amount corresponding to the customer spending limit into the customer spending account. The account management circuit 124 then compares the amount of the remaining funds to a combined amount of expenses owed by the customer within a predetermined period (e.g., a week, a month). If there are sufficient remaining funds to timely pay the customer's expenses, the account management circuit 124 may deposit an amount corresponding to the customer expenses into the customer payments. As the expenses become due, the account management circuit 124 may transfer funds from the customer reserve account to accounts of entities to which the customer owes payment.

In some embodiments, if there are insufficient remaining funds to timely pay the customer expenses, the account management circuit 124 may transmit an allocation suggestion to the customer device 110. The allocation suggestion may, for example, suggest that the customer reallocate funds from the customer spending account to the customer reserve account to provide the customer reserve account with sufficient funds to timely pay the customer expenses.

At process 412, the account management circuit 124 allocates the funds placed in the customer reserve account to the customer expenses. In an example, if there are sufficient funds available to timely pay all of the customer expenses, the account management circuit 124 divides the funds placed into the customer reserve account between each expense in accordance with the amount of each expense. However, if there are insufficient funds available to timely pay all of the customer expenses, the account management circuit 124 may generate an allocation between the customer expenses. In various embodiments, the account management circuit 124 generates an allocation using a prioritization algorithm that prioritizes the customer expenses based on a due date and amount. Generally speaking, customer expenses having greater amounts and having sooner due dates will receive a greater allocation.

In some embodiments, the account management circuit 124 allocates the available customer funds based on the entities to which the customer owes payments. For example, the financial institution computing system 120 may maintain a database storing information regarding the payment policies of various entities. The payment policies may include information pertaining to fees for late payments. In such an embodiment, the account management circuit 124 may retrieve payment policy information relating to the entities identified by the customer and allocate the available customer funds based on projected late fee amounts.

In various embodiments, once the account management circuit 124 generates an allocation, the allocation may be transmitted to the customer device 110 over the network 130 to render an allocation graphical user interface to the customer. The allocation graphical user interface may include representations of the amounts allocated to the customer spending account and the customer reserve account. The allocation graphical user interface may also include amounts allocated to upcoming payments owed by the customer. An example allocation graphical user interfaces are described with respect to FIG. 5D.

At process 414, the account management circuit 124 determines if the customer has any remaining funds. For example if the total available amount of funds (e.g., the combination of an initial account balance and a deposit of customer funds into the customer spending account and the customer reserve account) exceeds the total amount of customer expenses by more than the customer spending limit, the account management circuit 124 may determine that there are remaining customer funds.

At process 416, the account management circuit 124 prompts the customer to allocate any remaining funds. In some embodiments, the account management circuit 124 may initially allocate any remaining customer funds to the customer spending account, but indicate to the customer that such remaining funds are unallocated. This way, the remaining funds are available for utilization by the customer in payment card transactions. Alternatively, the account management circuit 124 may initially allocate any remaining customer funds to the customer reserve account, but indicate to the customer that such remaining funds are unallocated. Alternatively, the account management circuit 124 may initially allocate a first portion (e.g., a first half) of the remaining funds to the customer spending account and a second portion of the remaining funds to the customer reserve account (e.g., a second half). This way, the customer has a portion of the remaining funds for payment card transactions, and a portion set aside for future expenses of the customer that may become due.

In some embodiments, the account management circuit 124 facilitates the transmittal of an allocation notification to the customer device 110. The allocation notification may include a push notification (e.g., transmitted via a push notification service) alerting the customer of an unallocated amount, and prompt the customer to sign into the financial institution client application 116 to provide an input to allocate the remaining amount.

Referring now to FIG. 5A, an example expense graphical user interface 500 is shown. In some embodiments, the expense graphical user interface 500 may be presented to the customer via the financial institution client application 116 as an extension of the registration process described with respect to FIGS. 3A-3J. For example, upon the customer registering for an account, funding the account and setting up account access credentials, the financial institution client application 116 may cause the customer device 110 to present the customer with the expense graphical user interface 500. In some embodiments, the customer may provide an input to view the expense graphical user interface 500.

As shown, the expense graphical user interface 500 includes a payment addition window 502 and an entity identifying window 506. The payment addition window 502 includes a plurality of classifications of various entities to which the customer may owe payments. Next to each classification is an addition button 504. As indicated by the emboldened addition button 504, upon the customer selecting a particular addition button 504, the customer device 110 may retrieve a listing of entities associated with the selected classification (e.g., from a database maintained at the financial institution computing system 120) and use the retrieved listing to populate the entity identifying window 506. The entity identifying window 506 enables the customer to select an entity from the listing of entities at which the customer has an account.

In some embodiments, upon the customer selecting a particular entity, the customer may be brought to an additional interface enabling the customer to input an account number of the customer at the entity. As described herein, the financial institution computing system 120 may utilize such information to receive information regarding payments owed by the customer from an external computing system and make such payments using funds placed into the customer reserve account. Additionally, the customer may input additional preferences as to making payments to a particular entity. For example, the customer may indicate a preference to have the customer's bills paid automatically.

Referring now to FIG. 5B, an example deposit graphical user interface 508 is shown. In some embodiments, the deposit graphical user interface 508 may be presented to the customer via the financial institution client application 116 as an extension of the registration process described with respect to FIGS. 3A-3J. For example, upon the customer registering for an account, funding the account, and setting up account access credentials, the financial institution client application 116 may cause the customer device 110 to present the customer with the deposit graphical user interface 508. In some embodiments, the customer may provide an input to view the expense graphical user interface 500.

As shown, the deposit graphical user interface 508 includes a government benefit button 510, a direct deposit button 512, and a skipping button 514. The government benefit button 510 is configured to receive a customer preference to deposit government benefits into the customer's account. In response to the customer selecting the government benefit button 510, the customer may be presented with another interface enabling the customer to identify a government benefit (e.g., from a dropdown menu) and input information (e.g., an account number) associated with the benefit. The financial institution computing system 120 may utilize such information to request that the customer's benefits be deposited into the customer spending and reserve account. The direct deposit button 512 is configured to receive a customer preference to have a paycheck or the like deposited into the customer's spending and reserve accounts. In some embodiments, in response to the customer selecting the direct deposit button 512, the financial institution computing system 120 may send the customer or employer of the customer a form (e.g., via e-mail, the financial institution client application 116, or paper-based mail) to establish the customer account's as a direct deposit account. The skipping button 514 is configured to receive a customer preference to skip adding any deposits to the customer's spending and reserve accounts.

Referring now to FIG. 5C, an example account management graphical user interface 516 is shown. In various embodiments, the account management graphical user interface 516 is the home page presented to the customer upon the customer accessing the financial institution client application 116 on the customer device 110. For example, once all of the registration steps described herein have been completed, the account management graphical user interface 516 may serve as an initial starting screen for the customer to access various functions described herein.

As shown, the account management graphical user interface 516 includes a spending limit portion 518, an account balance portion 520, and a navigation portion 522. The spending limit portion 518 includes a representation of the customer spending limit (e.g., established via the method 200 discussed above). For example, the spending limit portion may include an amount remaining and a predetermined period before reaching the spending limit for the predefined period. The amount remaining may be the customer spending limit less the amounts of any transactions engaged in by the customer since the initiation of a spending limit period. The account balance portion 520 includes a representation of the total amount of customer funds in both the customer spending account and customer reserve account. As such, even though the customer has two separate checking accounts, the financial institution client application 116 provides the appearance that the customer has only a single checking account, thus simplifying the process of managing the account for the customer.

The navigation portion 522 provides the customer with access points to various functionalities described herein. As shown, the navigation portion 522 includes a dynamic icon 524, an advising icon 526, a transaction icon 528, and a navigation dialogue box 530. In some embodiments, the dynamic icon 524 updates depending on various actions taken by the customer within the financial institution client application 116. For example, if the customer is yet to provision the payment card associated with the customer spending account to the customer's digital wallet, the dynamic icon 524 may be configured to receive a customer preference to provision the payment card to the digital wallet. For example, the dynamic icon 524 may provide an input to program logic configured to interface with program logic of a mobile wallet application on the customer device 110, which may enable the customer to provision the payment card to the digital wallet. Alternatively or additionally, the dynamic icon 524 may cause the customer device 110 to transmit a provisioning signal to the financial institution computing system 120, which may (e.g., via the account management circuit 124) perform a process to provision the digital payment card to the customer's digital wallet.

In various embodiments, the dynamic icon 524 updates based on the most recent notification received by the customer from the financial institution computing system 120 within a predetermined period. If no notifications are received within the predetermined period, the account management graphical user interface 516 may not include the dynamic icon 524 (or it may be grayed out, or provided with an indicator that alerts the user to the fact that no notifications were received).

The advising icon 526 is configured to receive a customer input to view various recommendations generated by the customer device 110 and/or financial institution computing system 120 in accordance with the systems and methods disclosed herein. As described herein, program logic of the customer device 110 or the financial institution computing system 120 may be configured to assess account balance information and the customer's transaction history to make various recommendations to the customer. Upon the customer selecting the advising icon 526, the customer may be brought to another interface containing such suggestions.

The transaction icon 528 is configured to receive a customer preference to view upcoming payments owed by the customer (e.g., obtained via the customer entered information into an interface such as the expense graphical user interface 500 discussed with respect to FIG. 5A). The navigation dialogue box 530 is configured to provide the customer with access to a plurality of additional functionalities. For example, via the navigation dialogue box 530, the customer may input a sequence of symbols relating to the functionality that the customer wishes to access. In response to the customer inputting a symbol sequence, the customer device 110 may access a lookup table to identify an additional interface to present to the customer based on the symbol sequence provided by the customer. In some embodiments, upon the customer selecting the navigation dialogue box 530, a function history overlay is presented to the customer as an overlay to the account management graphical user interface 516. The function history overlay may include a listing of functionalities utilized by the customer within a predetermined period.

Referring now to FIG. 5D, an example allocation graphical user interface 532 is shown. In various embodiments, the customer may access the allocation graphical user interface 532 by indicating a preference to view allocations within the navigation dialogue box 530 in the account management graphical user interface 516 discussed with respect to FIG. 5C. In the example shown, the allocation graphical user interface 532 includes the spending limit portion 518 and the account balance portion 520, and the navigation dialogue box 530 discussed with respect to FIG. 5C. However, in the allocation graphical user interface 532, the navigation portion 522 is updated to include an allocation portion 534. The allocation portion 534 lists amounts of customer funds having various allocation statuses (e.g., allocated to the customer reserve account, allocated to the customer spending account, and unallocated). In some embodiments, the allocation portion 534 includes a portion configured to receive a customer preference to adjust the allocations (e.g., to transfer funds between the customer reserve account and the customer spending account, or to allocate unallocated funds).

Figure 5F:
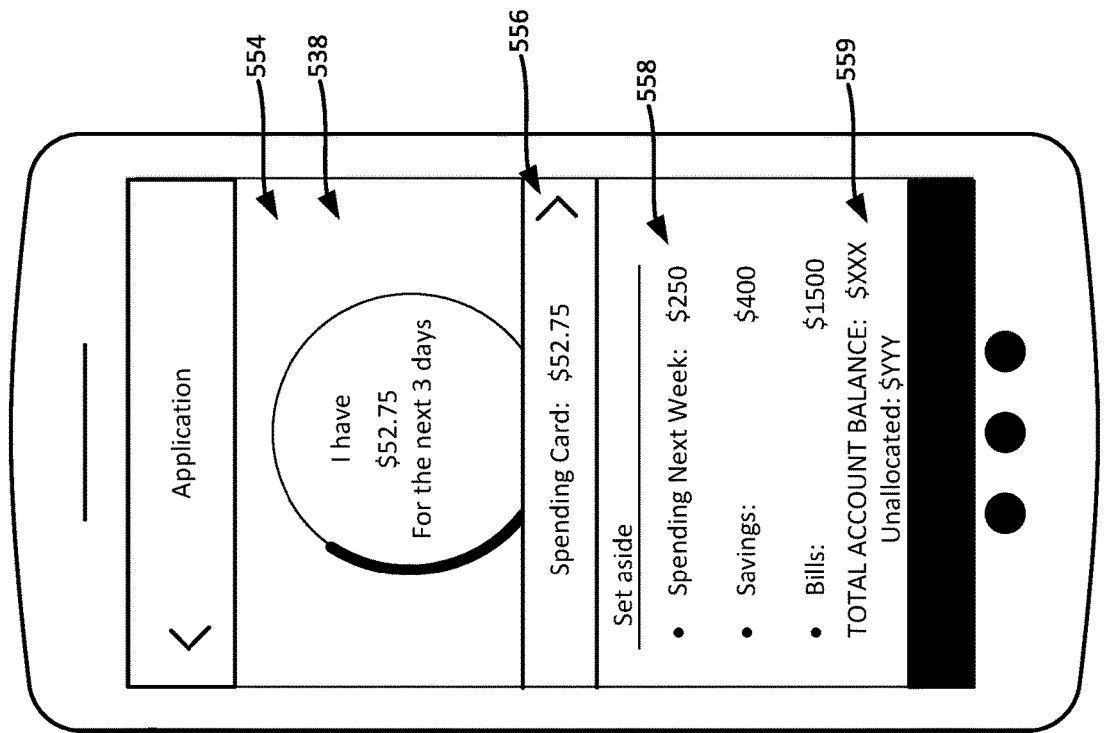
Figure 5E:
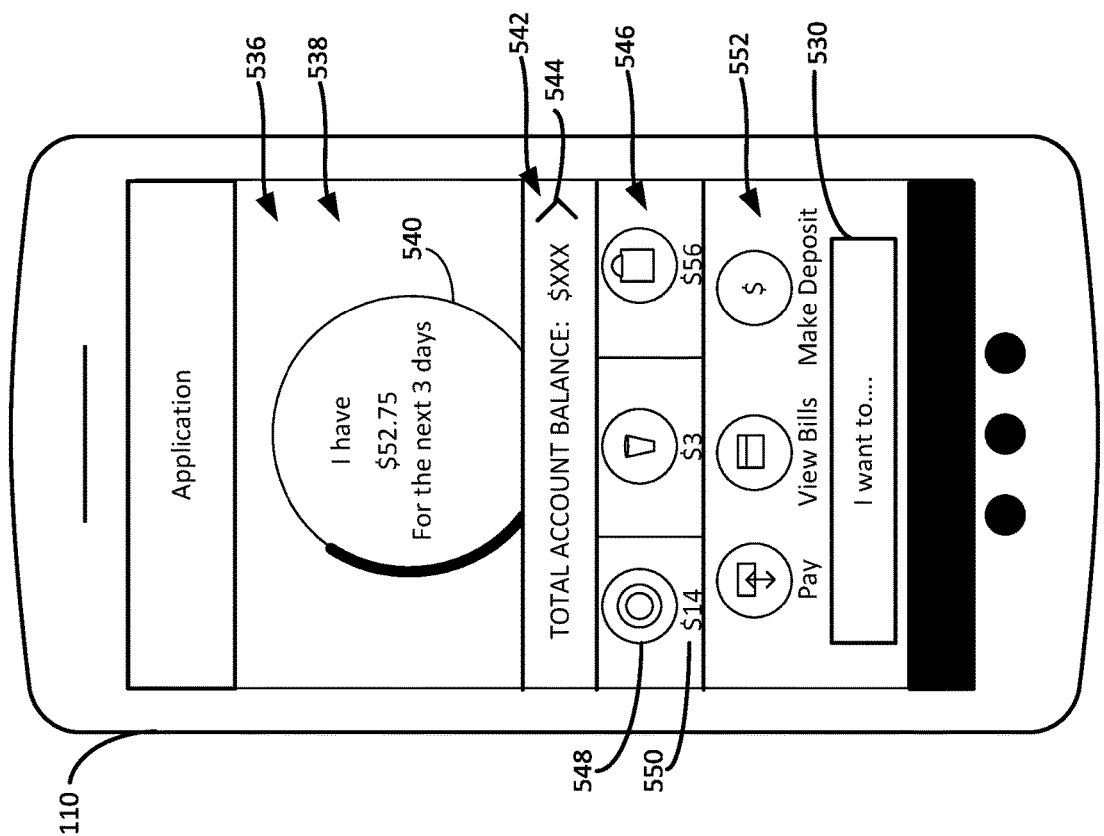

Referring now to FIG. 5E, an example account management graphical user interface 536 is shown. In various embodiments the account management graphical user interface 536 serves as a home screen for the financial institution client application 116. In the example shown, the account management graphical user interface 536 includes a spending limit portion 538, an account balance portion 542, a transaction portion 546, and a navigation portion 552. The spending limit portion 538 contains information regarding the relationship between the customer's spending and the customer's spending limit. As shown, the spending limit portion 538 includes a graphical status indicator 540. A portion of the graphical status indicator 540 is differentiated (e.g., bolded, colored differently) from the remaining portion of the graphical status indicator 540 to indicate a remaining portion of the customer's spending limit. As such, a ratio of the differentiated portion to the entire length of the graphical status indicator 540 may correspond to a percentage of the customer's spending limit that the customer has remaining to spend. In the example shown, the graphical status indicator 540 also surrounds a description the amount remaining that the customer has to spend. Accordingly, upon initiation of the financial institution client application 116, the customer device 110 may retrieve customer transaction data (e.g., either from the internal memory of the customer device 110 or the financial institution computing system 120), determine an amount that the customer has spent within a predetermined period, and compare the amount to the spending limit to render the spending limit portion 538.

In some embodiments, the account balance portion 542 is similar to the account balance portion 520 described with respect to FIG. 5C, except that the account balance portion 542 further includes a balance viewing icon 544 configured to receive a customer input to view the various account balances associated with the customer's account. The transaction portion 546 includes a listing of transactions that the customer has engaged in using the customer spending account. In the example shown, the transaction portion 546 includes a number of transaction entries, with each entry including a graphical icon 548 and an amount 550 associated with a particular transaction. In some embodiments, each of the entries also includes the dates at which the respective transactions took place. In an embodiment, the transaction portion 546 includes an entry for each transaction that the customer has engaged since the customer's spending limit was reset (e.g., if the customer has established a monthly spending limit, the transaction portion 546 may include an entry for each customer transaction since the beginning of the month). In some embodiments, the customer may scroll through the transaction portion 546 (e.g., by pressing a portion of a screen of the customer device 110 and sliding in a direction) to view all of the entries.

In the example shown, the icons 548 in each transaction entry reflect the type of transaction. The icons may be identical to the icons 370, 372, 374, 376, 378, and 380 described with respect to FIG. 3M. For example, in some embodiments, financial institution client application 116 causes the customer device 110 to access a lookup table that associates various merchant names (or merchant category codes) with particular graphical icons. In such embodiments, upon the customer device 110 retrieving customer transaction information (e.g., describing the amounts, timing, and merchants of recent customer transactions) from the financial institution computing system 120, the customer device 110 associates each transaction with an icon based on the merchant of the transaction, and populates various entries of the transaction portion 546 using the amounts and the associated icons. This way, the customer is able to quickly view the types of transactions that they have recently engaged in.

In some embodiments, the entries in the transaction portion 546 show up in a predetermined order. For example, in one embodiment, the transactions show up in chronological order. As such, the customer's most recent transaction may show up in the leftmost entry of the transaction portion 546, and the oldest transaction may show up in the rightmost entry. The customer may scroll to the left to view entries associated with older transactions. In some embodiments, the icons 548 are selectable by the customer to bring the customer to an additional graphical user interface containing information regarding the transaction associated with the icon 548. For example, such a graphical user interface may include the specific merchant and timing of the transaction, as well as any receipts stored in association with the transaction.

The navigation portion 552 includes various icons enabling the customer to take various other actions with respect to the customer spending account and the customer reserve account. For example, the navigation portion 552 may include a payment icon enabling the user to make a payment via the customer's mobile wallet (e.g., via a separate mobile wallet client application on the customer device 110 or via a wallet functionality integrated into the financial institution client application 116), a bill payment icon enabling the customer to view upcoming payments, as well as a deposit icon enabling the customer to transfer money to the customer's reserve account. In some embodiments, the navigation portion 552 includes an icon depicting a person-to-person payments functionality enabling the customer to select a person to transfer funds from the customer spending account to. Additionally, the navigation portion 552 includes a navigation dialogue box 530 as described with respect to FIG. 5C.

Referring now to FIG. 5F, an example account balance graphical user interface 554 is shown. In some embodiments, the customer is presented the account balance graphical user interface 554 upon selecting the balance viewing icon 544 of the account management graphical user interface 538 described with respect to FIG. 5E. As shown, the account balance graphical user interface 554 includes the balance view portion 538 described with respect to FIG. 5E, a spending account portion 556, and a reserve account portion 558. The spending account portion 556 includes a current balance of the customer's spending account. In embodiment, the balance shown corresponds to the amount shown in the spending limit portion 538. In some embodiments, the customer may select the spending account portion 556 to be brought to an additional interface containing a listing of various transactions conducted by the customer. The reserve account portion 558 lists allocations of the customer's funds placed in the customer reserve account. For example, the reserve account portion 558 may include a first amount that is scheduled to be transferred to the customer spending account (e.g., corresponding to a customer spending limit), a second amount that is allocated towards the customer's savings, and a third amount that is allocated to upcoming payments owed by the customer. In some embodiments the account balance graphical user interface 554 includes a total account balance portion 559 including depictions of the total amount of funds that the customer has available, as well as any portions of those funds that are unallocated.

Referring now to FIG. 5G, an allocation graphical user interface 560 is shown, according to an example embodiment. In some embodiments, the user may be presented with the allocation graphical user interface 560 upon the customer selecting the unallocated funds identified via the account balance graphical user interface 554 described with respect to FIG. 5F. As shown, the allocation graphical user interface 560 includes an unallocated funds portion 562 and an allocation portion 566. The unallocated funds portion 562 includes a depiction of an amount of funds that the customer is yet to allocate and an automatic allocation button 564 configured to receive a customer input to run the allocation prioritization algorithm (e.g., described with respect to FIG. 4) to generate a suggest allocation for the unallocated funds.

The allocation portion 566 includes a plurality of entries 568, 570, and 572. Each of the entries 568, 570, and 572 is associated with an envelope to which the customer may add a portion of the unallocated funds to. As will be appreciated, the allocation graphical user interface 560 may include any number of entries. In the example shown, the entry 568 is associated with a spending re-load envelope. The spending reload envelope depicts to the customer an amount that is scheduled to be transferred to the customer spending account upon the expiration of a period associated with the customer spending limit (e.g., at the beginning of the next week). The entry 570 depicts the current balance of the customer spending account, and the entry 572 depicts an amount currently allocated to an electric bill of the customer. Each entry includes a slide bar depicting a range of amounts that may be associated with each envelope if the customer allocates a portion of the unallocated funds to the envelope. In various embodiments, the customer may select each of the slide bars and allocate a portion of the unallocated funds to each envelope.

FIG. 5H shows an updated allocation graphical user interface 574 that is presented to the customer upon the customer allocating a portion of the unallocated funds to a particular envelope. In the example shown, the customer has allocated a portion of the funds to the envelope associated with the entry 568. Such an action results in each of the slide bars being updated. In the entry 568, the slide bar has been updated to reflect the amount that the customer has allocated to that envelope. The slide bars of the entries 570 and 572 have been updated to reflect the maximum amount that may be allocated to each of the associated envelopes given the customer's previous allocation to the envelope associated with the entry 568.

FIG. 5I shows an updated allocation graphical user interface 576 that is presented to the customer upon the customer allocating the remaining portion of the unallocated funds to the envelope associated with the entry 572. As shown, the entry 572 has been updated to reflect the customer's allocation. The allocation graphical user interface 576 also includes an allocation completion button configured to receive a customer preference to save the indicated allocation preferences.

Referring now to FIG. 5J an example functionality graphical user interface 574 is shown. In some embodiments, the functionality graphical user interface 574 is presented to the customer upon the customer entering a particular item into the navigation dialogue box 530 of the account management graphical user interface 536 described with respect to FIG. 5E. In the example shown, the customer has input the term "electric" into the navigation dialogue box 530. In response, the customer device 110 accesses a directory of functionalities and lists functionalities in the directory that are associated with the customer-input item. As shown, the functionality graphical user interface 574 includes a results portion 576 listing the results as well as a commonly used functionality portion 578. The results portion 576 lists entries associated with the item that the customer input into the navigation dialogue box 530. As shown, the entries are selectable and enable the customer to take a variety of actions with respect to the customer's electrical bill such as viewing the bill, changing an amount allocated to the bill, and reading a security guarantee associated with the bill. The commonly used functionality portion 578 may show up each time the customer inputs an item in the navigation dialogue box 530.

In some embodiments, the entries in the commonly used functionality portion 576 are populated based on the customer's history of using the financial institution client application 116. For example, each time the customer accesses a particular feature of the financial institution client application 116, the customer device 110 may add an entry to a customer activity log. To populate the commonly used functionality portion 576, the customer device 110 may access the activity log and identify a predetermined number (e.g., two) of functionalities that have been used the most within a predetermined period (e.g., a month). As such, the commonly used functionality portion 576 may be dynamically updated based on the customer's utilization of the financial institution client application 116. Thus, the navigation dialogue box 530 provides the customer with access to both a specific subset of functionalities (e.g., associated with the term the customer enters) as well as the functionalities most commonly used. This enables the customer to efficiently navigate through the financial institution client application 116.

Figure 5K:
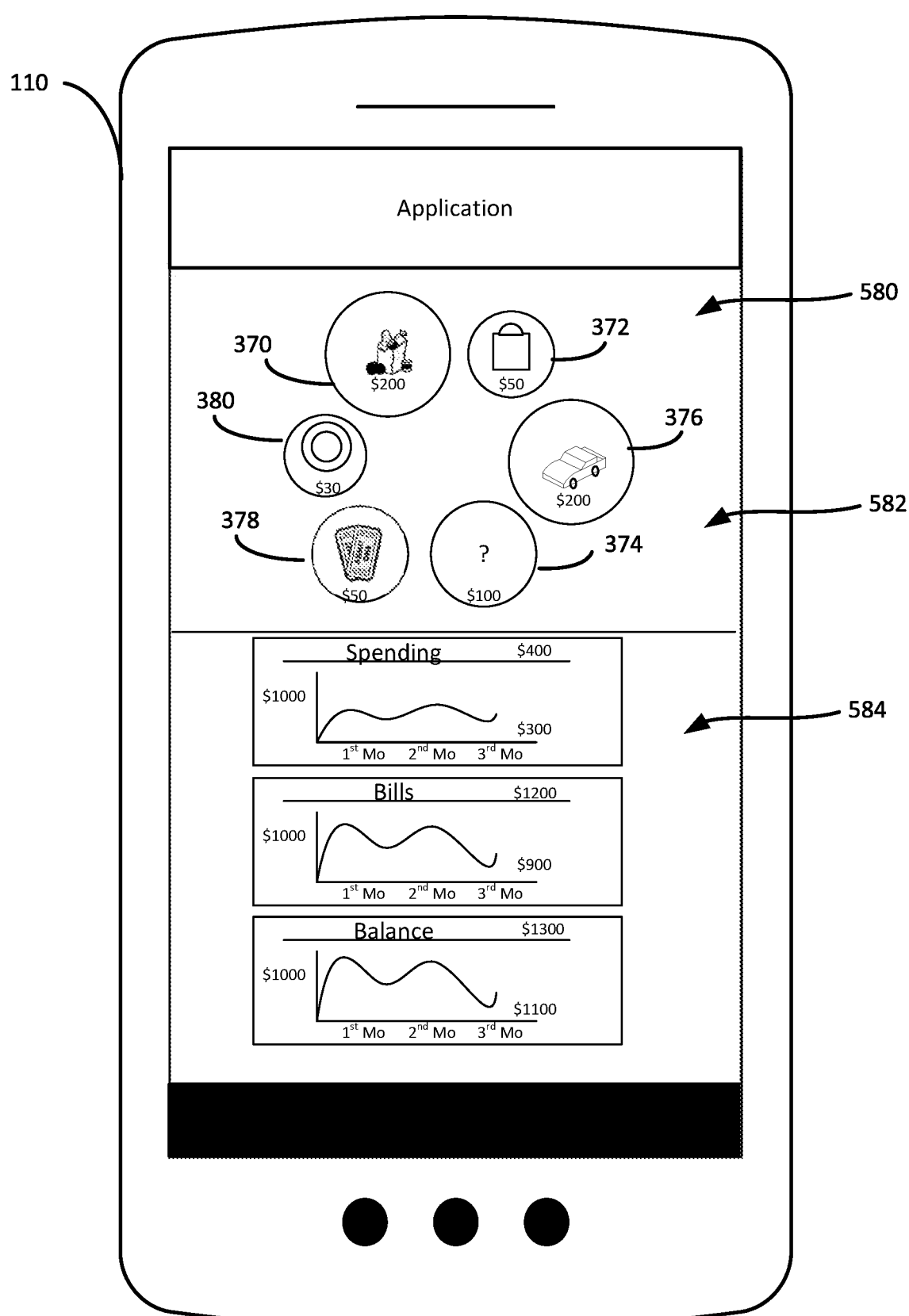

Referring now to FIG. 5K, a financial summary graphical user interface 580 is shown. In some embodiments, the financial summary graphical user interface 580 may be accessed via the account management graphical user interface 536 described with respect to FIG. 5E. For example, the customer may swipe and drag a location on the account management graphical user interface 536 to access the financial summary graphical user interface 580. As shown, the financial summary graphical user interface 580 includes a category spending portion 582 and a financial trends portion 584. As shown, the category spending portion 582 includes each of the icons 370, 372, 374, 376, 378, and 380 described with respect to FIG. 3K. Each of the icons 370, 372, 374, 376, 378, and 380 is updated to include an amount spent by the customer within a predetermined period (e.g., since the customer spending time was loaded with funds). Additionally, the icons 370, 372, 374, 376, 378, and 380 have been re-sized such that they have a size that corresponds with the spending amounts. Thus, the customer is able to efficiently view the category in which the customer spends the most money.

The financial trends portion 584 includes graphical depiction of the customer's finances. For example, the financial trends portion 584 includes graphs depicting the customer's level of spending, bill payments, and account balance over the course of a number of months. Each graphical depiction includes a target amount as well as an average amount. For example, in one embodiment, the graphical depiction of the customer's level of spending includes the customer's spending limit as well as the average level of customer spending. This way, the customer is able to efficiently view their spending in relation to a target level. As such, the financial summary graphical user interface 580 provides the customer with a broad overview of aspects of the customer's financials.

Figure 6:
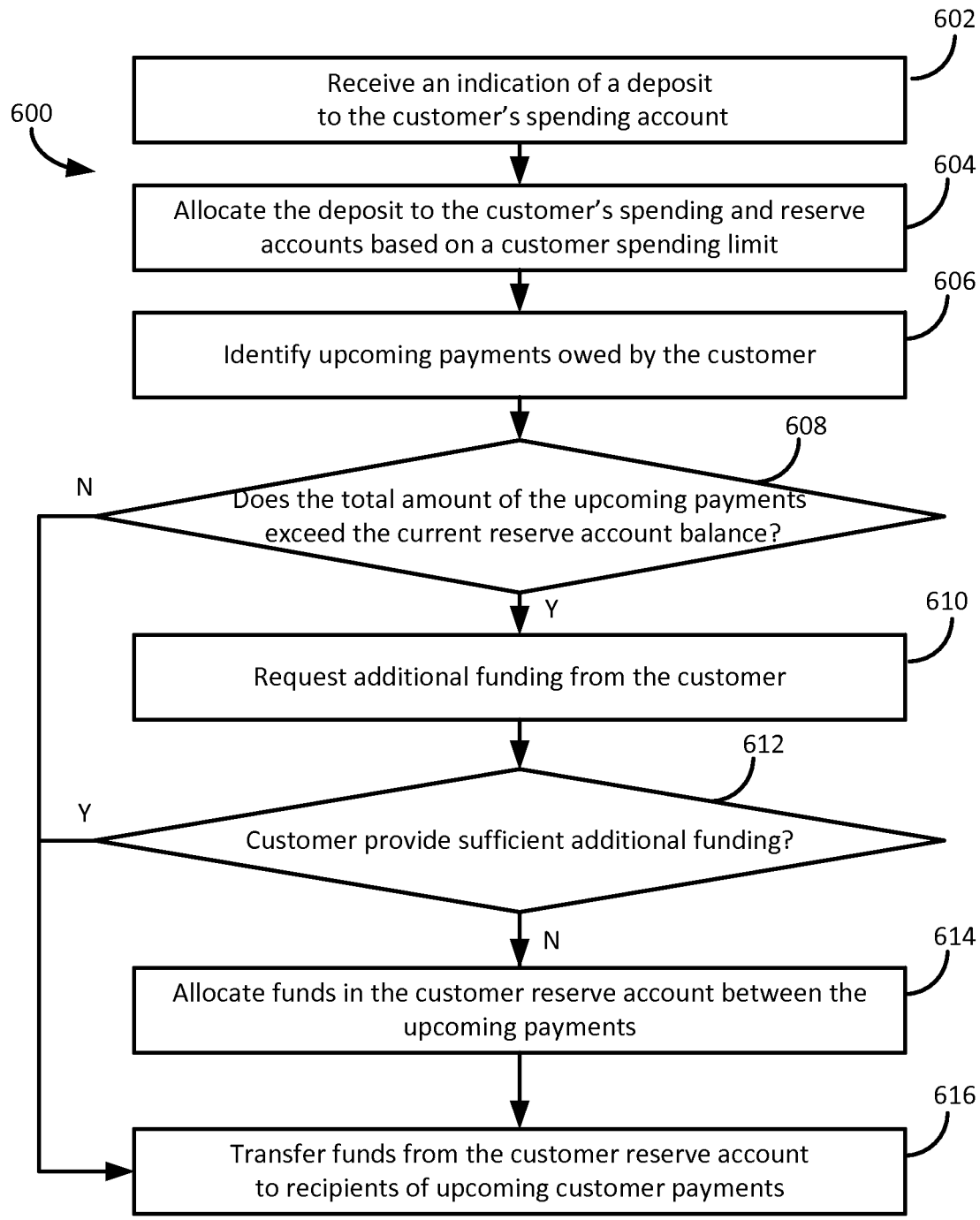
FIG. 6 is a flow diagram of a method of allocating a customer deposit, according to an example embodiment.

Referring now to FIG. 6, a method 600 of allocating a customer deposit into the customer spending and reserve accounts is shown, according to an example embodiment. The method 600 may be performed by components of FIG. 1 such that reference to components of FIG. 1 may be made to aid the description of the method 600. The method 600 may be executed by, for example, the account management circuit 124 of the financial institution computing system 120 or the customer device 110 to allocate customer funds amongst various payments owed by the customer to recipients and to transfer funds from the customer reserve account to the recipients.

At process 602, an indication of a deposit to the customer's spending account is received. In some embodiments, the customer may enter information regarding an alternative banking account of the customer and a deposit amount into a funding interface (e.g., similar to the graphical user interface 336 discussed with respect to FIG. 3G) presented to the customer via the financial institution client application 116. In response, the customer device 110 may transmit the information to the financial institution computing system 120 which may process the request and transfer funds into the customer spending account. In some situations, the indication of the deposit is received from an external computing system. For example, an employer of the customer may transfer funds from an employer account to the customer spending account as a direct deposit.

At process 604, the deposit to the customer's spending account is allocated to the customer's spending and reserve accounts based on a customer spending limit. For example, the account management circuit 124 may determine a current balance of the customer's spending account and compare the amount to a customer spending limit. If the current balance is below the spending limit, the account management circuit 124 may allocate a portion of the deposit corresponding to the difference to the customer spending account. Alternatively or additionally, the account management circuit 124 may allocate a predetermined amount to the customer spending account. The predetermined amount may be determined based on a deposit schedule (e.g., based on the customer's income and the frequency that the customer receives deposits from an employer). The predetermined amount may be set such that an amount corresponding to the customer spending limit is transferred into the customer spending account each spending limit period (i.e., the period to which the customer spending limit applies, such as a month). In some embodiments, after the initial deposit into the customer's spending account, the remaining funds are allocated to the reserve account.

At process 606, upcoming payments owed by the customer are identified. In some embodiments, the account management circuit 124 retrieves information regarding customer expenses from the accounts database 126 (e.g., information regarding bills or other expenses of the customer), and identifies payments owed by the customer within a predetermined period (e.g., week, month, etc.). In some embodiments, the account management circuit 124 requests information regarding customer expenses from external computing systems and identifies the upcoming customer payments based on information received from such external systems. In some embodiments, the customer device 110 requests such information from the financial institution computing system 120, which may return the information to the customer device 110 for identification of the upcoming payment of the customer.

At process 608, the total amount of the upcoming payments owed by the customer is compared with the current balance of the reserve account balance. If the customer has sufficient finds in the customer reserve account, method 600 moves on to process 616 to transmit funds to recipients of the upcoming customer payments. However, if there are insufficient funds in the customer reserve account to make all of the upcoming payments owed by the customer, additional funds are requested from the customer at process 610. In an embodiment, the account management circuit 124 facilitates a push notification being provided to the customer (or any other type of notification and request to the customer). An example push notification is described with respect to FIG. 7E. The push notification may prompt the customer to access the financial institution client application 116, which may cause the customer device 110 to present the customer with a prompt (e.g., via a message) to indicate if the customer has any additional funds to report. An example of such a message is described with respect to FIG. 7F.

At process 612, a determination is made whether the customer provided sufficient funds to timely make the upcoming payments owed by the customer. Such a determination may be made by either the customer device 110 or the account management circuit 124 based on a customer response to the message presented to the customer at process 610. If the customer provided sufficient funds to timely make the upcoming payments the method 600 advances to process 616 to transmit funds to the recipients of the customer's upcoming payments. However, if the customer did not provide sufficient funds, the customer's funds in the customer reserve account are allocated between upcoming customer payments at process 614. For example, the account management circuit 124 may generate an allocation using the prioritization algorithm described herein.

At process 616, funds are transferred to recipients of upcoming customer payments. For example, using information provided by the customer during the method 200 described with respect to FIG. 2, the account management circuit 124 may formulate transaction requests on dates pre-set by the customer to various entities to which the customer owes payment. In some embodiments, the funds are transferred directly from the customer reserve account to the recipients of the upcoming customer payments. In alternative embodiments, the funds are first transferred from the customer reserve account to the customer spending account prior to being transferred to the recipients.

Referring now to FIG. 7A, an example notification graphical user interface 700 including a push notification 702 is shown. In some embodiments, the financial institution computing system 120 (e.g., via the account management circuit 124) is configured to cause the push notification 702 to be provided to the customer device 110 (e.g., via a push notification service) upon the receipt of funds from an external entity (e.g., an employer) directed to the customer's spending and reserve accounts. In various embodiments, the push notification 702 includes a call to a function of the financial institution client application 116 that causes the home screen of the financial institution client application 116 (e.g., the account management graphical user interface 516 described with respect to FIG. 5C) to update.

Referring now to FIG. 7B, an example updated account management graphical user interface 704 is shown. As shown, the updated account management graphical user interface 704 shares many of the same features as the account management graphical user interface 516 described with respect to FIG. 5C, except the updated account management graphical user interface includes an updated dynamic icon 706 including information regarding the customer deposit. For example, in one embodiment, the updated dynamic icon 706 includes the amount of the deposit, an allocation of the deposit between the customer spending account and the customer reserve account, and a customer preference indicator 708. Via the customer selection indicator 708, the customer may indicate a preference to accept the depicted allocation or to make an adjustment to the depicted allocation.

Figure 7D:
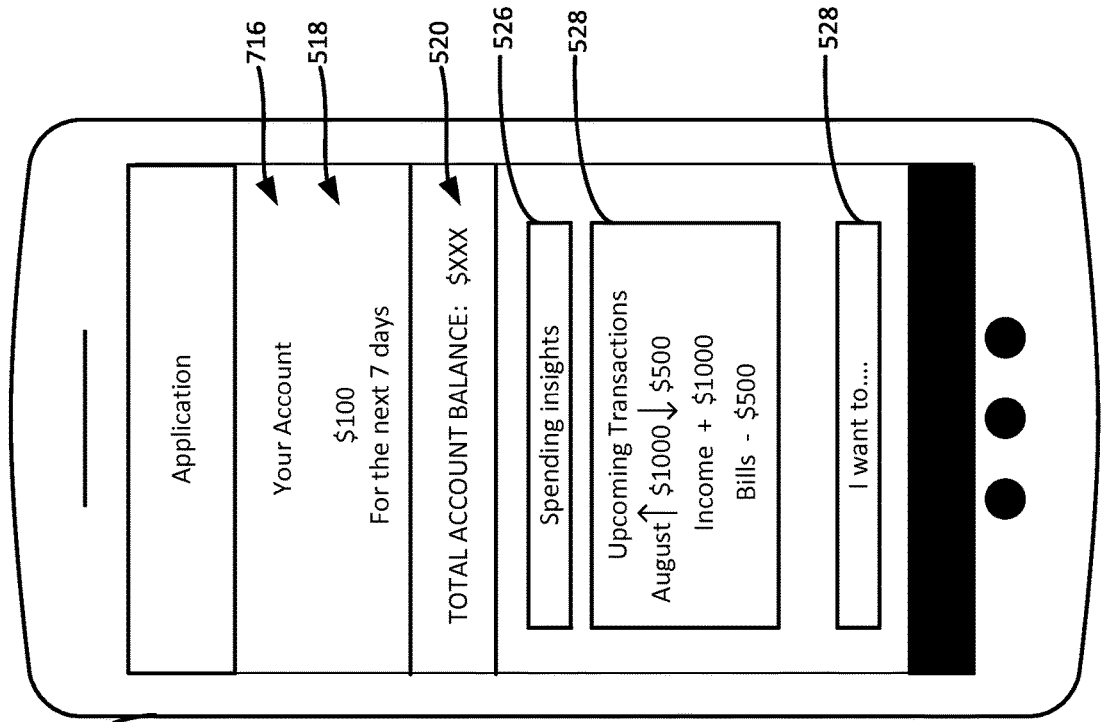
Figure 7C:
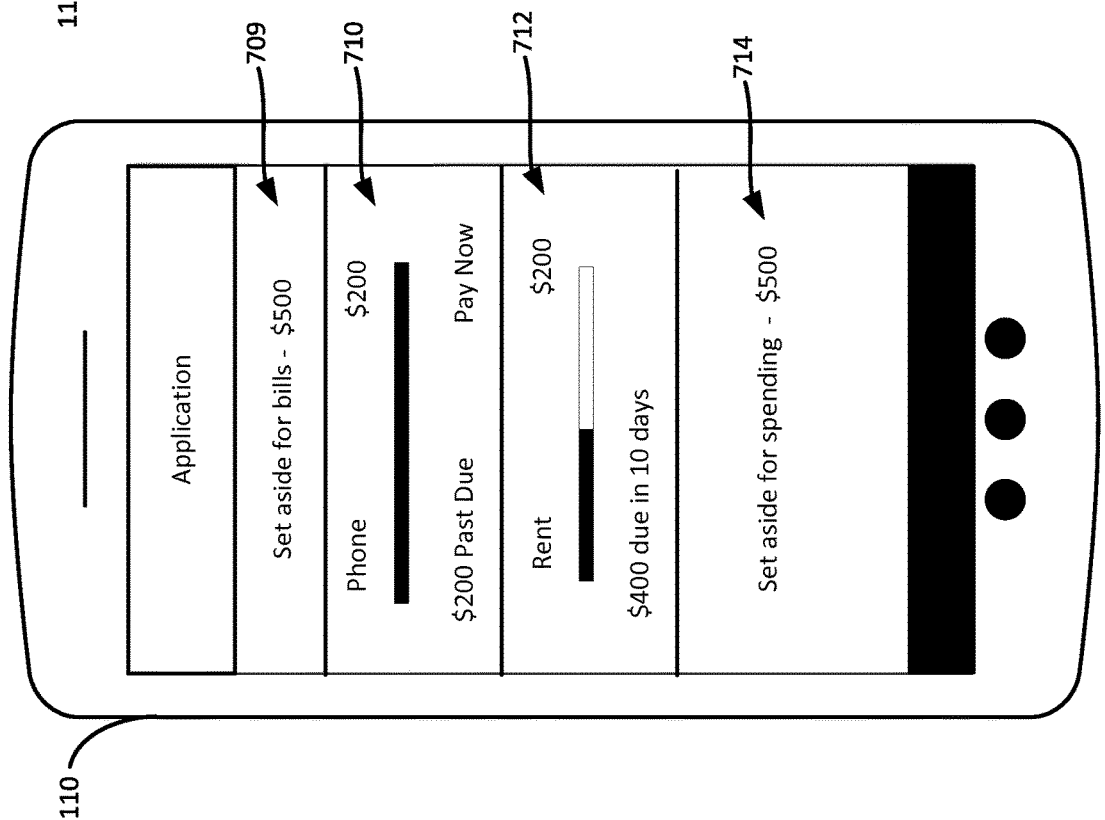

FIG. 7C shows an example allocation graphical user interface 709. In some embodiments, the customer is brought to the allocation graphical user interface 709 when the customer indicates a preference to adjust the allocation depicted in the updated dynamic icon 706 of the updated account management graphical user interface 704 described with respect to FIG. 7B. The allocation graphical user interface 709 includes payment portions 710 and 712 and a spending portion 714. The spending portion 714 indicates an amount of a recent deposit into the customer's spending and reserve accounts has been allocated to the customer's spending account. Payment portions 710 and 712 indicate to the customer an amount and due date of upcoming payments owed by the customer. Each of the payment portions 710 and 712 includes an adjustable slide bar that enables the customer to adjust an amount of the deposit that is allocated to each payment. In response to the customer making an adjustment to the allocation, the provided allocation may be stored at the customer device 110. Additionally, when the customer has allocated a sufficient amount (e.g., a total amount owed or a minimum amount owed) to a particular payment, the payment portions 710 and 712 may update to include payment buttons that may cause the customer device 110 to transmit instructions to the financial institution computing system 120 to transfer the indicated amount of funds from the customer reserve account to the depicted entity.

FIG. 7D shows an example updated account management graphical user interface 716. In various embodiments, the customer may be presented with the updated account management graphical user interface 716 in response to the customer selecting the transaction icon 528 of the account management graphical user interface 516 described with respect to FIG. 5C. As shown, the transaction icon 528 is expanded to include a summary of expected cash flows of the customer within a predetermined period (e.g., a month). The expanded transaction icon 528 includes an expected amount of customer income to be received (e.g., based on a customer direct deposit) as well as a total amount of payments owed by the customer. This way, the customer is quickly able to view whether sufficient funds are available to make the expected payments.

FIG. 7E shows an example funding notification graphical user interface 718 including a deficient funds notification 720. In various embodiments, the financial institution computing system 120 (e.g., via the account management circuit 124) transmits the deficient funds notification 720 to the customer device 110 upon determining that the total amount of upcoming payments owed by the customer exceeds an amount of funds in the customer reserve account (e.g., at process 608 of the method 600 described with respect to FIG. 6). In various embodiments, the deficient funds notification 720 includes a call to a function of the financial institution client application 116 to cause the customer device 110 to present the customer with a message prompt upon the customer accessing the financial institution client application 116.

FIG. 7F shows an example messaging graphical user interface 722 according to an example embodiment. In some embodiments, the financial institution client application 116 causes the customer device to present the customer with the messaging graphical user interface 722 after the customer receives the deficient funds notification 720. As shown, the messaging graphical user interface 722 includes an initial message 724 notifying the customer of a fund deficiency, a query 726, a customer response 728, an allocation suggestion message 730, and a customer preference indicator 732. For example, the customer device 110 may formulate the initial message 724 based on account balance information and customer payment information received from the financial institution computing system 120. The allocation suggestion message 730 may be generated by the customer device 110 based on a reallocation of funds in the customer reserve account calculated by either the financial institution computing system 120 or the customer device 110. The customer preference indicator 732 is configured to receive an input to accept the suggested allocation or to make an adjustment. If the customer accepts the allocation, the customer device 110 may provide a notification signal to the financial institution computing system 120 which may update the allocation of the funds in the customer reserve account. If the customer does not accept the allocation, the customer may be brought to an interface similar to the allocation graphical user interface 709 described with respect to FIG. 7C.

In various embodiments, the financial institution client application 116 includes a messaging applet configured to generate messaging graphical user interfaces in response to certain determinations being made regarding the customer's finances. In this regard, the messaging applet may include messaging templates that are retrieved in response to certain triggers (e.g., the customer spending above or below the customer spending limit, the customer having insufficient funds in the customer reserve account to make an upcoming payment, a detected change in the customer's income). Each messaging template may have an associated set of responses that may be presented as options to respond to the messages presented to the customer. Additional message templates may be presented to the customer based on the customer's responses to the messages. As such, rather than presenting the customer with multiple graphical user interfaces to notify the customer and enable the customer to perform a needed action, the financial institution client application 116 efficiently presents all of such information to the customer via a single interface in an interactive manner.

Figure 8:
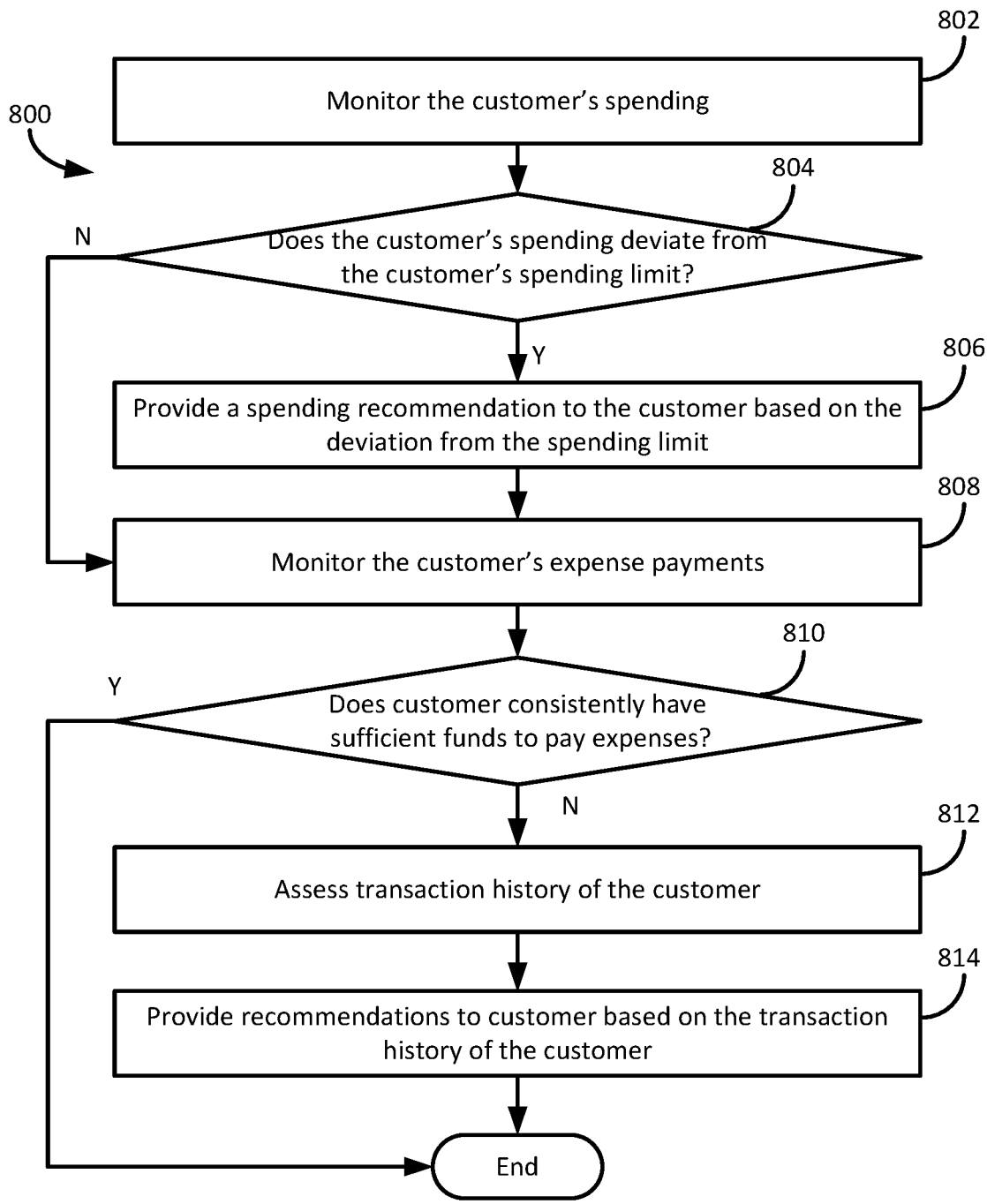
FIG. 8 is a flow diagram of a method of monitoring the financial activity of a customer and providing recommendations to the customer, according to an example embodiment.

Referring now to FIG. 8, a flow diagram of a method 800 of monitoring the financial activity of a customer and providing recommendations to the customer is shown, according to an example embodiment. Method 800 may be performed by the components of FIG. 1 such that reference may be made to the components of FIG. 1 to aid in the description of the method 800. The method 800 may be executed by the account management circuit 124 or customer device 110 to provide financial advice to the customer based on the customer's spending behavior.

At process 802, the account management circuit 124 monitors the customer's spending habits and activities. For example, the account management circuit 124 may retrieve a transaction history of the customer and determine an amount spent by the customer within various predetermined periods. At process 804, the account management circuit 124 compares the customer's spending levels to the customer's spending limit and determines whether the customer's spending amount differs from the spending limit by more than various thresholds. If not, method 800 advances to process 808 to monitor the customer's expense payments. In some embodiments, the customer device 110 performs such an analysis upon receipt of the customer's transaction history from the financial institution computing system 120.

However, if the customer's spending behavior deviates from the customer's spending limit by more than a threshold amount, the account management circuit 124 provides a spending recommendation to the customer at process 806. For example, if the customer consistently spends more than the customer spending limit (e.g., the customer spends more than the spending limit in more than predetermined percentage of weeks), a recommendation to cut spending may be provided. Such a recommendation may identify particular transactions of the customer that are selected by comparing characteristics of the customer's transactions (e.g., amounts, merchants, timing) with transactions of other customers of the financial institution. If the customer engages in transactions or patterns of transactions avoided by other customers having a similar income as the customer, for example, the recommendation to cut spending may identify the transactions. In some embodiments, the recommendation enables the customer to establish transaction rules for the customer spending account such that, upon the customer attempting to engage in one of the identified transactions, the transaction is either denied or an alert may be provided to the customer.

If the customer consistently spends amounts below the customer spending limit, the account management circuit 124 or customer device 110 may provide advice as to what the customer should do with the extra funds. For example, a recommendation may be provided for the customer to establish a savings or investment account.

At process 808, the account management circuit 124 monitors payments of the customer's expenses. For example, based on customer transaction information stored at the accounts database 126 (e.g., describing amounts owed by the customer to external entities by certain dates and amounts paid by the customer), the account management circuit 124 may determine if the customer consistently makes such payments timely at process 810. If so, the method 800 may end.

However, if the customer does not consistently make such payments, the account management circuit 124 may assess the transaction history of the customer at process 812 to identify negative customer spending habits (e.g., by comparing the customer's spending transactions to transactions of other customers of the financial institution). Based on such habits, the account management circuit 124 may provide recommendations to the customer at process 814. For example, the recommendation may prompt the customer to transfer funds from the customer spending account to the customer reserve account and/or lower the customer's spending limit. The recommendation may also describe transactions that the customer should avoid to accommodate for such changes. Alternatively or additionally, the recommendation may include suggestions as to the customer's expenses. For example, the recommendation may suggest that the customer discontinue receiving a service from a particular service provider (so as to lower the total amount of the customer's bill payments) if the total amount of the customer's bills each month differs from that of other customers having a similar income to the customer.

FIG. 9A shows an example spending notification graphical user interface 900 including a spending trend notification 902. In various embodiments, the financial institution computing system 120 (e.g., via the account management circuit 124) transmits spending trend notification 902 to the customer device 110 upon determining that the customer's spending is consistently below the customer's spending limit. Alternatively, the customer device 110 may generate such a notification upon making such a determination. In various embodiments, the spending trend notification 902 includes a call to a function of the financial institution client application 116 to cause the customer device 110 to present the customer with a message prompt upon the customer accessing the financial institution client application 116.

FIG. 9B shows an example recommendation messaging graphical user interface 904 that may be presented to the customer upon the customer accessing the financial institution client application 116 after receiving the spending trend notification 902. The recommendation messaging graphical user interface 904 includes a spending notification messages 906 and 908, a customer response 910, a customer naming prompt 912, and customer naming options 914 and 916. The spending notification messages 906 and 908 indicate to the customer how much the customer has deviated from the customer's spending limit and also ask the customer if the customer would like to start saving funds. In response to the customer indicating such a preference in the customer response 910, the customer naming prompt 912 and customer naming options 914 and 916 may be presented to the customer. The customer naming option 914 enables the customer to manually input a name for the customer's saving account. The customer naming option 916 enables the customer to provide a default name for the customer's saving account.

Upon the customer naming the savings account, the account management circuit 124 may establish a savings account for the customer and periodically transfer the indicated amount of funds (e.g., the average amount the customer spends below the customer spending limit) from the customer's spending account the savings account. Thus, technically and beneficially, the systems and methods herein enable customers to dynamically establish accounts based on the customer's current financial situation.

Referring now to FIG. 9C, a savings forecast graphical user interface 918 is shown, according to an example embodiment. In various embodiments, the savings forecast graphical user interface 918 is presented to the customer automatically upon the customer device 110 and/or financial institution computing system 120 determining that the customer's current spending behavior creates the potential for the customer to set aside additional funds for savings. For example, in one embodiment, the customer device 110 aggregates the customer's current spending limit with other allocations of the customer's funds (e.g., to upcoming payments owed by the customer and an amount set aside for a savings fund). The customer device 110 also projects amounts that will be deposited into the customer spending and reserve accounts (e.g., based on previous deposits made by the customer). The aggregated amount is then compared with the projected deposit amount and, if the projected deposit amount is greater than the aggregated amount, then the customer has the potential to save funds. In such cases, the customer device 110 may generate a customer savings forecast based on the extent to which the projected deposits exceed the aggregated amount. Once the savings forecast is generated, the customer device 110 may notify the customer (e.g., via a notification interface similar to that described with respect to FIG. 9A) and/or configure the financial institution client application 116 to present the savings forecast graphical user interface 918 to the customer upon the customer accessing the financial institution client application 116 on the customer device 110. In some embodiments, the customer device 110 may project a customer savings forecast in response to the customer indicating a request to view the savings forecast (e.g., via the navigation dialogue box 530 described with respect to FIG. 5C).

Referring now to FIG. 9D, a recommendation messaging graphical user interface 922 is shown. In various embodiments, the recommendation messaging graphical user interface 922 may be presented to the customer upon the financial institution computing system 120 or customer device 110 identifying an indicator that the customer's income has increased. For example, upon receiving a deposit into the customer reserve account, the financial institution computing system 120 (e.g., via the account management circuit 124) may compare the amount of the deposit with customer's previous deposits to determine that the deposit is greater than previous deposits. Alternatively or additionally, the financial institution computing system 120 may assess the customer's deposit history for patterns that are indicative of an increase in the customer's income. For example, a sudden increase in the amount of direct deposits may indicate that the customer has received at raise at her employment. Upon identifying such an indication, the financial institution computing system 120 may provide a notification to the customer device 110, which may be similar in form to the spending notification graphical user interface 900 described with respect to FIG. 9A. As described herein, such a notification may cause the customer device 110 to present the customer with the recommendation messaging graphical user interface 922 upon the customer accessing the financial institution client application 116.

As shown, the recommendation messaging graphical user interface 922 includes an initial message 924 indicating the identified deposit pattern to the customer, as well as a graphical depiction 926 of recent deposits into the customer's account. As shown, the initial message 924 prompts the customer to confirm whether the customer has received a raise. If the customer responds in the affirmative (as indicated by the customer response message 928), the customer device 110 may generate a response message 930 that indicates that, if the customer's spending limit is maintained, the customer may set aside additional money into savings. In some embodiments, the response message includes a savings forecast (e.g., similar to the savings forecast 920 described with respect to FIG. 9C), and includes a query requesting a customer preference. In addition to the response message 930, the customer device 110 also causes preference options 932 and 934 to be presented to the customer. The preference options 932 and 934 are configured to receive customer inputs to set aside funds for savings within the customer reserve account. In response to the customer selecting the preference option 932, the customer device 110 may present the customer with an additional interface enabling the customer to indicate an amount to set aside.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A financial institution computing system associated with a financial institution, comprising:
   a network interface configured to communicate data over a network;
   an accounts database configured to store information regarding a plurality of accounts associated with a plurality of customers of the financial institution; and
   an account management circuit configured to:
      establish, via the network interface, a connection with a financial institution client application of a mobile device associated with a customer;
      receive, by the network interface and via the financial institution client application, a customer request to establish an account at the financial institution;
      activate, via the network interface and via the financial institution client application, a camera of the mobile device associated with the customer;
      query, via the network interface and via the financial institution client application, the mobile device to receive an image of an identification form of the customer;
      receive, via the network interface and via the camera, the image of the identification form of the customer;

in response to receiving the image, analyze the image and determine that the image includes a signature associated with the customer based on the analysis;

in response to determining that the image includes the signature associated with the customer, verify an identity of the customer and create a first and a second checking account for the customer, the first checking account having a payment card associated therewith, the second checking account not having any payment cards associated therewith;

receive, by the network interface and via the financial institution client application, information regarding a funding amount for the first and second checking accounts;

receive, by the network interface and via the financial institution client application, information regarding a first expense of the customer by:
  providing a first graphical user interface (GUI) to the mobile device associated with the customer;
  receiving, via the first GUI, an indication of an identity of an entity associated with the first expense and an indication of an account of the customer at the entity; and
  querying a computing system associated with the entity using the indication of the account to receive an amount and a due date of the first expense;

fund the second checking account with a first portion of the funding amount based on the amount and the due date of the first expense;

in response to funding the second checking account, generate and provide a second GUI to the mobile device associated with the customer via the financial institution client application, wherein the second GUI comprises a first selectable feature associated with a total account balance and a second selectable feature associated with a dialogue box;

in response to receiving an indication of a selection of the first selectable feature, generate and provide a third GUI to the mobile device associated with the customer via the financial institution client application, wherein the third GUI comprises a third selectable feature associated with funds that have yet to be allocated to the first checking account or to the second checking account;

in response to receiving an indication of a selection of the third selectable feature, generate and provide a fourth GUI to the mobile device associated with the customer via the financial institution client application, wherein the fourth GUI comprises a first graphical representation of an indication of funds allocated to the first checking account, a second graphical representation of an indication of funds allocated to the second checking account, a third graphical representation of an indication of funds that have yet to be allocated, and a fourth selectable feature associated with the funds that have yet to be allocated;

receive, via the fourth GUI, an indication of a selection of the fourth selectable feature on the fourth GUI that causes a movement of a corresponding amount of funds that have yet to be allocated to the first checking account, wherein the movement of the funds causes a dynamic adjustment of a numerical indicator associated with the third graphical representation;

in response to receiving an indication of a selection of the second selectable feature associated with the dialogue box, generate and provide a fifth GUI to the mobile device associated with the customer via the financial institution client application, wherein the fifth GUI comprises a commonly used functionality portion;

parse an activity log of the mobile device associated with the customer, wherein the activity log includes a plurality of selectable functionalities;

determine, based on the activity log, an amount of use of each functionality of the plurality of selectable functionalities within a predetermined period of time;

dynamically update, via the network interface and via the financial institution client application, based on the determined amount of use of each functionality, the commonly used functionality portion of the fifth GUI to display a subset of the plurality of selectable functionalities that have been used more than a predefined amount within the predetermined period of time;

receive, via the network interface and via the financial institution client application, an indication to provision the first checking account to a mobile wallet application of the mobile device associated with the customer after the movement of the funds; and link, via the network interface, to the mobile wallet application and one of: (i) tokenize an account number associated with the first checking account and transmit the tokenized account number to the linked mobile wallet application to provision the first checking account to the mobile wallet application; or (ii) facilitate a tokenization of the first checking account to the linked mobile wallet application.

2. The financial institution computing system of claim 1, wherein the account management circuit is further configured to:
  receive, by the network interface and via the financial institution client application, a spending limit from the customer; and
  fund the first checking account with a second portion of the funding amount based on the spending limit.

3. The financial institution computing system of claim 1, wherein the account management circuit is further configured to:
  receive, by the network interface and via the financial institution client application, information regarding a second expense of the customer; and
  allocate the first portion of the funding amount between the first and second expenses of the customer.

4. The financial institution computing system of claim 3, wherein the allocation is based on at least one of due dates of the first and second customer expenses, amounts of the first and second customer expenses, and the funding amount.

5. The financial institution computing system of claim 4, wherein the account management circuit is further configured to:
  determine that the amounts of the first and second customer expenses are greater than the first portion of the funding amount; and
  in response to the determination, transmit, by the network interface, a notification to the mobile device associated with the customer.

6. The financial institution computing system of claim 4, wherein the account management circuit is further configured to:

receive, by the network interface and via the financial institution client application, a first customer allocation preference indicating a customer-preferred allocation of the first portion of the funding amount between the first and second customer expenses; and adjust the customer-preferred allocation based on the first customer allocation preference.

7. The financial institution computing system of claim 4, wherein the account management circuit is further configured to:

receive, by the network interface and via the financial institution client application, a second customer allocation preference indicating a customer-preferred re-allocation of the funding amount between the first and second checking accounts; and fund the second checking account in accordance with the second customer allocation preference.

8. The financial institution computing system of claim 1, wherein the first customer expense involves a payment owed by the customer to a recipient by a date, wherein the account management circuit is further configured to authorize a transfer of funds to the recipient from the second checking account.

9. The financial institution computing system of claim 8, wherein the authorization of the transfer of funds to the recipient occurs automatically at the date.

10. The financial institution computing system of claim 1, wherein the funding amount is a direct deposit of a check to the customer.

11. A computer-implemented method, comprising:

establishing, by a financial institution computing system associated with a financial institution and via a network interface configured to communicate data over a network, a connection with a financial institution client application of a mobile device associated with a customer;

receiving, by the financial institution computing system and via the financial institution client application, a customer request to establish an account at the financial institution;

causing, by the financial institution computing system and via the financial institution client application, activation of a camera of the mobile device associated with the customer;

querying, by the financial institution computing system and via the financial institution client application, the mobile device to receive an image of an identification form of the customer;

receiving, by the financial institution computing system and via the camera, the image of the identification form of the customer;

analyzing, by the financial institution computing system, the image and determining that the image includes a signature associated with the customer based on the analysis;

in response to determining that the image includes the signature associated with the customer, verifying an identity of the customer and creating, by the financial institution computing system, first and second checking accounts for the customer, the first checking account having a payment card associated therewith, the second checking account not having any payment cards associated therewith;

receiving, by the financial institution computing system and via the financial institution client application, information regarding a funding amount for the first and second checking accounts;

receiving, by the financial institution computing system and via the financial institution client application, information regarding a first expense of the customer, wherein receiving information regarding the first expense comprises:

providing a first graphical user interface (GUI) to the mobile device associated with the customer;

receiving, via the first GUI, an indication of an identity of an entity associated with the first expense and an indication of an account of the customer at the entity; and querying a computing system associated with the entity using the indication of the account to receive an amount and a due date of the first expense;

funding, by the financial institution computing system, the second checking account with a first portion of the funding amount based on the amount and the due date of the first expense;

generating and providing, by the financial institution computing system and via the financial institution client application, a second GUI to the mobile device associated with the customer, wherein the second GUI comprises a first selectable feature associated with a total account balance and a second selectable feature associated with a dialogue box;

receiving, by the financial institution computing system and via the financial institution client application, an indication of a selection of the first selectable feature, generating and providing, by the financial institution computing system and via the financial institution client application, a third GUI to the mobile device associated with the customer, wherein the third GUI comprises a third selectable feature associated with funds that have yet to be allocated to the first checking account or to the second checking account;

receiving, by the financial institution computing system and via the financial institution client application, an indication of a selection of the third selectable feature;

generating and providing, by the financial institution computing system and via the financial institution client application, a fourth GUI to the mobile device associated with the customer, wherein the fourth GUI comprises a first graphical representation of an indication of funds allocated to the first checking account, a second graphical representation of an indication of funds allocated to the second checking account, a third graphical representation of an indication of funds that have yet to be allocated, and a fourth selectable feature associated with the funds that have yet to be allocated;

receiving, by the financial institution computing system, via the fourth GUI, an indication of a selection of the fourth selectable feature on the fourth GUI that causes a movement of a corresponding amount of funds that have yet to be allocated to the first checking account, wherein the movement of the funds causes a dynamic adjustment of a numerical indicator associated with the third graphical representation;

receiving, by the financial institution computing system and via the financial institution client application, an indication of a selection of the second selectable feature associated with the dialogue box;

generating and providing, by the financial institution computing system and via the financial institution client application, a fifth GUI to the mobile device associated with the customer, wherein the fifth GUI comprises a commonly used functionality portion;

parsing, by the financial institution computing system and via the financial institution client application, an activity log of the mobile device associated with the customer, wherein the activity log includes a plurality of selectable functionalities;

determining, by the financial institution computing system, based on the activity log, an amount of use of each functionality of the plurality of selectable functionalities within a predetermined period of time;

dynamically updating, by the financial institution computing system and via the financial institution client application, based on the determined amount of use of each functionality, the commonly used functionality portion of the fifth GUI to display a subset of the plurality of selectable functionalities that have been used more than a predefined amount within the predetermined period of time;

receiving, by the financial institution computing system and via the financial institution client application, an indication to provision the first checking account to a mobile wallet application of the mobile device associated with the customer after the movement of the funds; and linking, by the financial institution computing system, to the mobile wallet application and one of: (i) tokenizing an account number associated with the first checking account and transmit the tokenized account number to the linked mobile wallet application to provision the first checking account to the mobile wallet application; or (ii) facilitating a tokenization of the first checking account to the linked mobile wallet application.

12. The method of claim 11, further comprising:
receiving, by the financial institution computing system and via the financial institution client application, a spending limit from the customer; and
funding, by the financial institution computing system, the first checking account with a second portion of the funding amount based on the spending limit.

13. The method of claim 11, further comprising:
receiving, by the financial institution computing system and via the financial institution client application, information regarding a second expense of the customer; and
allocating, by the financial institution computing system, the first portion of the funding amount between the first and second expenses of the customer.

14. The method of claim 13, wherein the allocation is based on at least one of due dates of the first and second customer expenses, amounts of the first and second customer expenses, and the funding amount.

15. The method of claim 14, further comprising:
determining, by the financial institution computing system, that the amounts of the first and second customer expenses are greater than the first portion of the funding amount; and
in response to the determination, transmitting, by the financial institution computing system, a notification to the mobile device associated with the customer.

16. The method of claim 14, further comprising:
receiving, by the financial institution computing system and via the financial institution client application, a first customer allocation preference indicating a customer-preferred allocation of the first portion of the funding amount between the first and second customer expenses; and adjusting, by the financial institution computing system, the customer-preferred allocation based on the first customer allocation preference.

17. The method of claim 14, further comprising:
receiving, by the financial institution computing system and via the financial institution client application, a second customer allocation preference indicating a customer-preferred re-allocation of the funding amount between the first and second checking accounts; and
funding, by the financial institution computing system, the second checking account in accordance with the second customer allocation preference.

18. The method of claim 11, wherein the first customer expense involves a payment owed by the customer to a recipient by a date, wherein the method further comprises authorizing a transfer of funds to the recipient from the second checking account.

19. The method of claim 18, wherein the authorization of the transfer of funds to the recipient occurs automatically at the date, wherein the funding amount is a direct deposit of a check to the customer.

20. A computer-implemented method, comprising:
receiving, by a mobile device, a first input from a customer indicating a spending limit for the customer over a predetermined period;
receiving, by the mobile device, an indication of a deposit of an amount of funds into a first checking account of the customer;
determining, by the mobile device, a first portion of the amount of funds to be allocated towards the first checking account of the customer based on the spending limit;
in response to determining the first portion of funds, presenting, by the mobile device, a first graphical user interface to the customer, wherein the first graphical user interface comprises a first selectable feature associated with a total account balance and a second selectable feature associated with a dialogue box;
in response to receiving a second input indicating a selection of the first selectable feature, presenting, by the mobile device, a second graphical user interface to the customer, wherein the second graphical user interface comprises a third selectable feature associated with funds that have yet to be allocated to the first checking account;
in response to receiving a third input indicating a selection of the third selectable feature, presenting, by the mobile device, a third graphical user interface to the customer, the third graphical user interface including a first graphical representation of the first portion, a second graphical representation of a second portion of the amount of funds allocated to a second checking account of the customer, a third graphical representation of an indication of funds that have yet to be allocated, and a fourth selectable feature associated with the funds that have yet to be allocated;
receiving, via the third graphical user interface, a fourth input indicating a selection of the fourth selectable feature on the third graphical user interface that causes a movement of a corresponding amount of funds that have yet to be allocated to the first checking account, wherein the movement of the funds causes a dynamic adjustment of a numerical indicator associated with the third graphical representation;
in response to receiving a fifth input indicating a selection of the second selectable feature associated with the dialogue box, presenting, by the mobile device, a fourth graphical user interface to the customer, wherein the fourth graphical user interface comprises a commonly used functionality portion;

parsing, by the mobile device, an activity log associated with the customer, wherein the activity log includes a plurality of selectable functionalities;

determining, by the mobile device, based on the activity log, an amount of use of each functionality of the plurality of selectable functionalities within a predetermined period of time;

dynamically updating, by the mobile device, based on the determined amount of use of each functionality, the commonly used functionality portion of the fourth graphical user interface to display a subset of the plurality of selectable functionalities that have been used more than a predefined amount within the predetermined period of time;

receiving, by the mobile device, a sixth input from the customer to provision the first checking account to a mobile wallet application of the mobile device after the movement of the funds; and linking, by the mobile device, the mobile wallet application with a tokenized account number associated with the first checking account received from a financial institution computing system communicably coupled to the mobile device based on the received sixth input.

21. The method of claim 20, wherein the first portion of the amount of funds corresponds to the spending limit.

22. The method of claim 21, wherein the second of the amount of funds corresponds to the remaining funds in the amount of funds after the first portion was allocated to the first checking account of the customer.

23. The method of claim 20, wherein the representation of the second portion includes a first allocation of the second portion between a plurality of payment obligations of the customer.

24. The method of claim 20, further comprising:

receiving, by the mobile device, an indication that there are insufficient funds in the second checking account of the customer to pay the plurality of payment obligations of the customer; and presenting, by the mobile device, a fifth graphical user interface to the customer, the fifth graphical user interface containing a second allocation of customer funds between the plurality of payment obligations of the customer, the second allocation being different than the first allocation.

25. The method of claim 24, further comprising:

receiving, by the mobile device, a seventh input from the customer to transfer a sub-portion of the first portion of the amount of funds from the first checking account to the second checking account;

updating, by the mobile device, the allocation based on an amount of the sub-portion; and presenting, by the mobile device, a sixth graphical user interface to the customer, the sixth graphical user interface containing an updated allocation of customer funds between the plurality of payment obligations of the customer.

\* \* \* \* \*